United States Patent
Miyamoto et al.

(10) Patent No.: US 9,715,305 B2
(45) Date of Patent: Jul. 25, 2017

(54) ELECTRONIC DEVICE AND VERIFICATION METHOD

(71) Applicant: FUJITSU LIMITED, Kawasaki-shi, Kanagawa (JP)

(72) Inventors: Akinori Miyamoto, Sagamihara (JP); Yasuhiro Endo, Ebina (JP); Yuichi Kamata, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/079,308

(22) Filed: Mar. 24, 2016

(65) Prior Publication Data
US 2016/0202837 A1 Jul. 14, 2016

Related U.S. Application Data

(63) Continuation of application No. PCT/JP2013/076055, filed on Sep. 26, 2013.

(51) Int. Cl.
*G06F 3/041* (2006.01)
*G06F 3/01* (2006.01)
(Continued)

(52) U.S. Cl.
CPC .............. *G06F 3/0416* (2013.01); *G06F 3/01* (2013.01); *G06F 3/016* (2013.01); *G06F 3/048* (2013.01);
(Continued)

(58) Field of Classification Search
CPC ......... G06F 3/016; G06F 3/014; G06F 3/0416
(Continued)

(56) References Cited

U.S. PATENT DOCUMENTS

2006/0152497 A1 7/2006 Rekimoto
2011/0291976 A1 12/2011 Takada et al.
(Continued)

FOREIGN PATENT DOCUMENTS

JP 2003-337649 11/2003
JP 2010-231609 10/2010
(Continued)

OTHER PUBLICATIONS

Takeyuki Dohda et al., "The Printed-matter Typecasting Method for Haptic Feel Design and Sticky-band Illusion", The collection of papers of the 11th SICE system integration division annual conference (SI2010, Sendai), Dec. 2010, pp. 174 to 177 (4 pages).
(Continued)

*Primary Examiner* — Calvin C Ma
(74) *Attorney, Agent, or Firm* — Fujitsu Patent Center

(57) ABSTRACT

An electronic device that includes a drive controller being configured to drive a vibrating element by using a drive signal causing the vibrating element to generate a natural vibration in an ultrasound-frequency-band in a touch surface, the drive controller being configured to drive the vibrating element so as to switch the natural vibration between a strong level and a weak level in accordance with a travel distance of a position of a erformed onto the touch surface, a first memory configured to store first data representing a first passcode corresponding to a number of times the natural vibration is switched between the strong level and the weak level, and a first verification part configured to verify a number of times the drive controller switches the natural vibration between the strong level and the weak level with the first passcode when the touch is performed onto the touch surface.

11 Claims, 14 Drawing Sheets

(51) Int. Cl.
*G06F 3/0484* (2013.01)
*G06F 3/0488* (2013.01)
*G06F 3/048* (2013.01)
*G06F 21/31* (2013.01)

(52) U.S. Cl.
CPC .......... *G06F 3/0412* (2013.01); *G06F 3/0488* (2013.01); *G06F 3/04845* (2013.01); *G06F 3/04847* (2013.01); *G06F 21/31* (2013.01)

(58) Field of Classification Search
USPC .................................................. 345/173, 174
See application file for complete search history.

(56) References Cited

U.S. PATENT DOCUMENTS

2012/0256858 A1 10/2012 Sudo
2013/0102281 A1 4/2013 Kanda et al.
2014/0229884 A1 8/2014 Shimazaki

FOREIGN PATENT DOCUMENTS

| JP | 2010-238222 | 10/2010 |
| JP | 2012-221179 | 11/2012 |
| JP | 2012-227741 | 11/2012 |
| JP | 2013-093699 | 5/2013 |
| NO | 2013035744 | 3/2013 |

OTHER PUBLICATIONS

Masashi Nakatani et al., "The Fishbone Tactile Illusion", Collection of papers of the 10th Congress of the Virtual Reality Society of Japan, Sep. 2005 (5 pages).
International Search Report, mailed in connection with PCT/JP2013/076055 and mailed Nov. 5, 2013 (1 page).

| FIRST PASSCODE | FIRST DIRECTION DATA | SECOND DIRECTION DATA | SECOND PASSCODE | THIRD DIRECTION DATA |
|---|---|---|---|---|
| 2,1 | 3 | 1 | 3 | 7 |
|  |  |  |  |  |
|  |  |  |  |  |
|  |  |  |  |  |
|  |  |  |  |  |

| SECOND PASSCODE | APPLICATION |
|---|---|
| 1 | app1 |
| 2 | app2 |
| 3 | app3 |
| . | ... |

ELECTRONIC DEVICE AND VERIFICATION METHOD

CROSS-REFERENCE TO RELATED APPLICATION

This application is a continuation application of International Application PCT/JP2013/076055 filed on Sep. 26, 2013 and designated the U.S., the entire contents of which are incorporated herein by reference.

FIELD

The embodiment discussed herein is related to an electronic device and a verification method.

BACKGROUND

There has been a tactile sensation producing apparatus which includes a display, a contact detector that detects a contact state of user's manipulate operation to the display and a haptic vibration generating part which generates haptic vibration that gives a designated sensation to the user's body-part contacting the display (for example, see Patent Document 1).

The tactile sensation producing apparatus further includes a vibration waveform data generating means which generates a waveform data based on a detected result of the contact detector. The waveform data is used for generating the haptic vibration. The tactile sensation producing apparatus further includes an ultrasound modulating means which performs a modulating process on the waveform data by utilizing an ultrasound as a carrier wave and outputs an ultrasound signal generated by the modulating process to the haptic vibration generating means as a signal used for generating the haptic vibration.

The ultrasound modulating means performs either a frequency modulation or a phase modulation. The ultrasound modulating means further performs an amplitude modulation.

There has been an input device that includes a touch detect sensor which detects a touch position of a biological body or an object in a designated detection area, and a control means which performs an input process for accepting an input of a designated function in response to a touch position or a change of the touch position detected by the touch sensor and outputs a drive signal every time the touch position changes more than or equal to a designated amount (see patent document 2, for example). The input device further includes an actuator which vibrates at least a vicinity of an arrange position of the touch sensor for a temporary period of time in response to the drive signal output from the control means.

There has been a mobile terminal that includes a display part, a touch panel attached to the display part, and a detect part detecting a touch operation performed on the touch panel. The mobile terminal can set a lock state which limits an execution of a designated process based on the touch operation (see patent document 3, for example).

This mobile terminal includes a memory part which memorize notice information relating to a designated function and a display processor which displays an object and the notice information on a display area of the display part. The object moves in response to the touch operation when accepting the touch operation for unlocking the mobile terminal in a state where the mobile terminal is locked.

This mobile terminal further includes a determine part and an execution part. The determine part determines whether the touch operation which causes the object to move and release in a display area displaying the notice information. The execution part unlocks the mobile terminal and executes a function relating to the notice information if the determine part determines that the touch operation which causes the object to move and release in the display area displaying the notice information is detected.

However, a ultrasound frequency used in the conventional tactile sensation producing apparatus may be any frequency as long as the frequency is higher than that of an audio frequency (about 20 kHz). No specific setting is made for the ultrasound frequency. Accordingly, the tactile sensation producing apparatus cannot provide a fine or crisp tactile sensation to the user.

Although the conventional input device includes the actuator which vibrates at least the vicinity of the arrange position of the touch sensor for the temporary period of time every time the touch position changes more than or equal to the designated amount, no creative solution is made for the vibration. Accordingly, the input device cannot provide a fine or crisp tactile sensation to the user.

Since the conventional mobile terminal does not vibrate a top panel, it becomes not possible for the user to obtain necessary information easily when the user performs the manipulation input necessary for a designated operation such as unlocking the mobile terminal, for example. Accordingly, the mobile terminal cannot provide a fine or crisp tactile sensation to the user.

RELATED-ART DOCUMENTS

Patent Documents

[Patent Document 1] Japanese Laid-open Patent Publication No. 2010-231609

[Patent Document 2] Japanese Laid-open Patent Publication No. 2003-337649

[Patent Document 3] Japanese Laid-open Patent Publication No. 2013-093699

SUMMARY

According to an aspect of the present application, there is provided an electronic device that includes a touch panel, a vibrating element generating a vibration in a manipulation input surface of the touch panel, a drive controller being configured to drive the vibrating element by using a drive signal causing the vibrating element to generate a natural vibration in an ultrasound-frequency-band in the manipulation input surface, the drive controller being configured to drive the vibrating element so as to switch the natural vibration between a strong level and a weak level in accordance with a travel distance of a position of a manipulation input performed onto the manipulation input surface, a first memory configured to store first data representing a first passcode corresponding to a first number of times the natural vibration is switched between the strong level and the weak level, and a first verification part configured to verify a second number of times the drive controller switches the natural vibration between the strong level and the weak level with the first passcode represented by the first data when the manipulation input is performed onto the manipulation input surface.

The object and advantages of the disclosure will be realized and attained by means of the elements and combinations particularly pointed out in the claims.

It is to be understood that both the foregoing general description and the following detailed description are exemplary and explanatory and are not restrictive of the invention as claimed.

DESCRIPTION OF EMBODIMENT

Hereinafter, an embodiment to which an electronic device and a verification method of the present invention are applied will be described.

Embodiment

Figure 1:
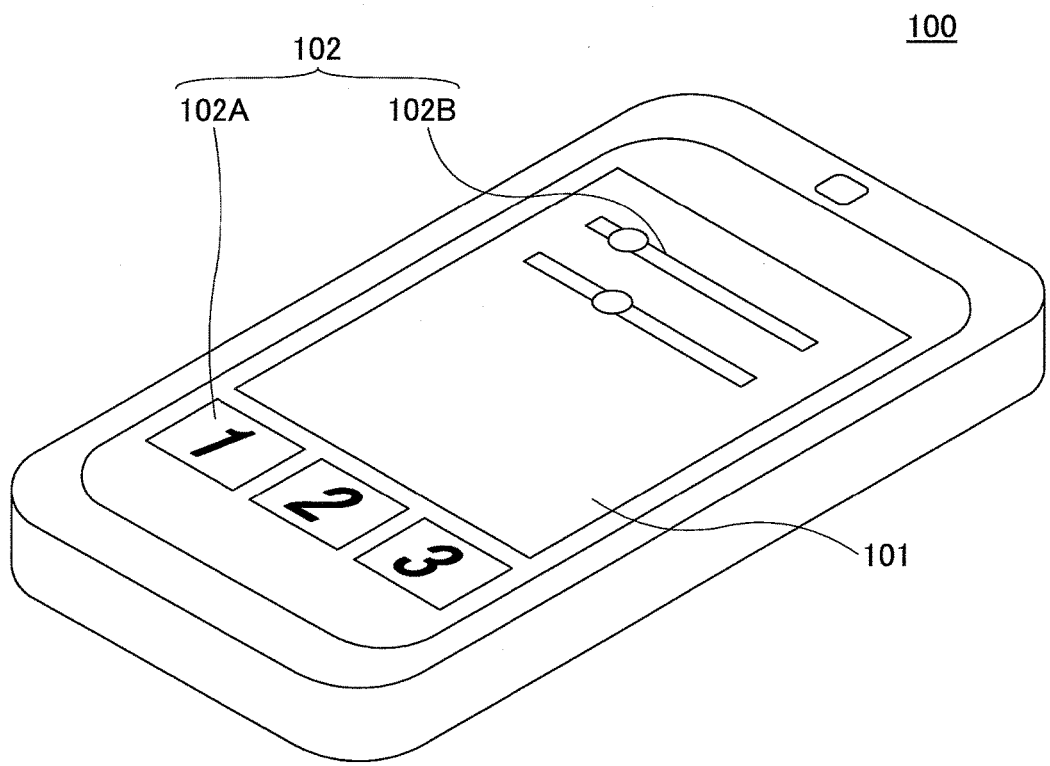
FIG. 1 is a diagram illustrating an electronic device according to an embodiment in perspective view.

FIG. 1 is a diagram illustrating an electronic device 100 according to the embodiment in perspective view.

The electronic device 100 is a smart phone or a tablet computer that includes a touch panel as a manipulation input part, for example. The electronic device 100 may be any device as long as the device includes a touch panel as a manipulation input part. Accordingly, the electronic device 100 may be a device such as a handy type information terminal device, an Automatic Teller Machine (ATM) placed at a specific location or the like, for example.

In a manipulation input part 101 of the electronic device 100, a display panel is disposed under a touch panel, and a button 102A, a slider 102B or the like (hereinafter referred to as Graphic User Interface (GUI) input part(s) 102) are displayed on the display panel.

A user of the electronic device 100 touches the manipulation input part 101 in order to manipulate (operate) the GUI input part 102 with a fingertip under normal conditions.

Hereinafter, a detailed configuration of the electronic device 100 will be described with reference to FIG. 2.

Figure 2:
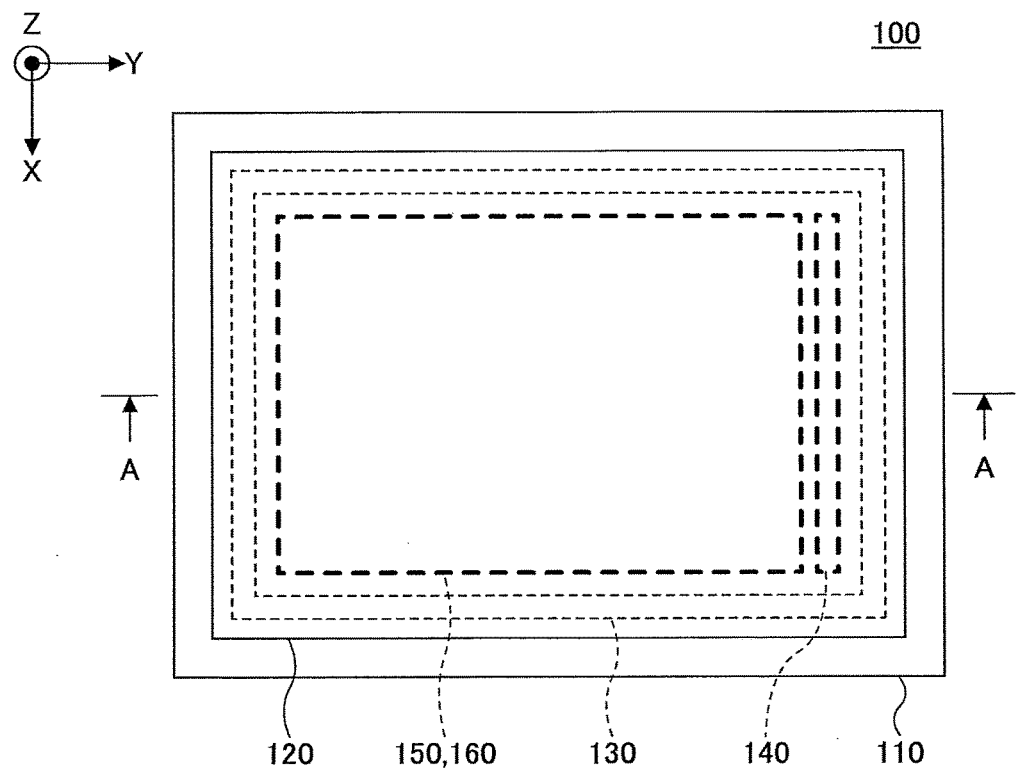
FIG. 2 is a diagram illustrating the electronic device of the embodiment in plan view.
Figure 3:
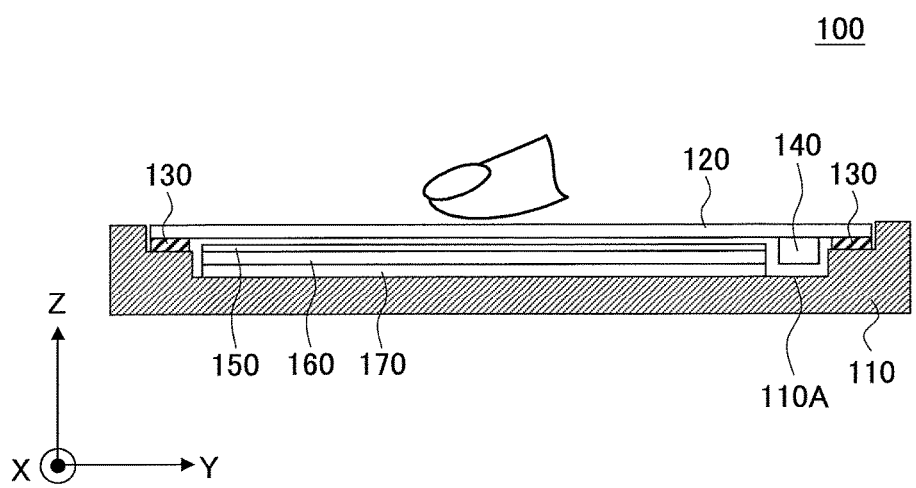
FIG. 3 is a diagram illustrating a cross-sectional view of the electronic device taken along a line A-A of FIG. 2.

FIG. 2 is a diagram illustrating the electronic device 100 of the embodiment in plan view. FIG. 3 is a diagram illustrating a cross-sectional view of the electronic device 100 taken along a line A-A of FIG. 2. An XYZ coordinate system as an orthogonal coordinate system is defined in FIGS. 2 and 3.

The electronic device 100 includes a housing 110, a top panel 120, a double-faced adhesive tape 130, a vibrating element 140, a touch panel 150, a display panel 160 and a substrate 170.

The housing 110 is made of a plastic, for example. As illustrated in FIG. 3, the substrate 170, the display panel 160 and the touch panel 150 are contained in a concave portion 110A of the housing 110, and a top panel 120 is adhered onto the housing 110 by the double-faced adhesive tape 130.

The top panel 120 is a plate-shaped member having a rectangular shape in plan view and is made of a transparent glass or a reinforced plastic such as polycarbonate. A surface of the top panel 120 which is located on a positive side in Z axis direction is one example of a manipulation input surface into which the user of the electronic device 100 performs a manipulation input.

The vibrating element 140 is bonded on a surface of the top panel 120 which is located on a negative side in Z axis direction, and the top panel 120 is adhered to the housing 110 by the double-faced adhesive tape 130. Herein, the double-faced adhesive tape 130 is not necessarily a rectangular-ring-shaped member in plan view as illustrated in FIG. 3, as long as the double-faced adhesive tape 130 can adhere four corners of the top panel 120 to the housing 110.

The touch panel 150 is disposed on the negative side in Z axis direction of the top panel 120. The top panel 120 is provided for the sake of protecting the surface of the touch panel 150. Another panel, protection film or the like may be provided onto the surface of the top panel 120.

In a state where the vibrating element 140 is bonded onto the surface of the top panel 120 located on the negative side in Z axis direction, the top panel 120 vibrates if the vibrating element 140 is being driven. In the embodiment, a standing wave is generated in the top panel 120 by causing the top panel 120 to vibrate at a natural vibration frequency (natural resonance frequency or eigenfrequency) of the top panel 120. Since the vibrating element 140 is bonded to the top panel 120, it is preferable to determine the natural vibration frequency in consideration of a weight of the vibrating element 140 or the like, in a practical manner.

The vibrating element 140 is bonded on the surface of the top panel 120 which is located on the negative side in Z axis direction at a location along the short side extending in X axis direction at a positive side in Y axis direction. The vibrating element 140 may be any element as long as it can generate vibration at an ultrasound-frequency-band. A piezoelectric element such as a piezo element is used as the vibrating element 140, for example.

The vibrating element 140 is driven in accordance with a drive signal output from the drive controller which will be described later. An amplitude (intensity) and a frequency of the vibration output from the vibrating element 140 is set (determined) by the drive signal. An on/off action of the vibrating element 140 is controlled in accordance with the drive signal.

The ultrasound-frequency-band is a frequency band which is higher than or equal to about 20 kHz, for example. According to the electronic device 100 of the embodiment, the frequency at which the vibrating element 140 vibrates is equal to a number of vibrations per unit time (frequency) of the top panel 120. Accordingly, the vibrating element 140 is driven in accordance with the drive signal so that the vibrating element 140 vibrates at a number of natural vibrations per unit time (natural vibration frequency) of the top panel 120.

The touch panel 150 is disposed on upper side (positive side in Z axis direction) of the display panel 160 and is disposed on lower side (negative side in Z axis direction) of the top panel 120. The touch panel 150 is one example of a coordinate detector which detects a position at which the user of the electronic device 100 touches the top panel 120. Hereinafter, the position is referred to as a position of the manipulation input.

The display panel 160 disposed under the touch panel 150 displays various GUI buttons or the like. Hereinafter, the various GUI buttons or the like are referred to as a GUI input part. The user of the electronic device 100 ordinarily touches the top panel 120 with a fingertip in order to manipulate (operate) the GUI input part.

The touch panel 150 is any coordinate detector as long as it can detect the position of the manipulation input onto the top panel 120 performed by the user. The touch panel 150 may be a capacitance type coordinate detector or a resistance film type coordinate detector, for example. Hereinafter, the embodiment in which the touch panel 150 is the capacitance type coordinate detector will be described. In a case where the touch panel 150 is the capacitance type, the touch panel 150 can detect the manipulation input performed onto the top panel 120 even if there is a clearance gap between the touch panel 150 and the top panel 120.

Although the top panel 120 is disposed on the manipulation input surface side of the touch panel 150 in the present embodiment, the top panel 120 may be integrated with the touch panel 150. In this case, the surface of the touch panel 150 is equal to the surface of the top panel 120 as illustrated in FIGS. 2 and 3, and the surface of the touch panel 150 becomes the manipulation input surface. Otherwise, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

In a case where the touch panel 150 is the capacitance type, the touch panel 150 may be disposed on the top panel 120. In this case, the surface of the touch panel 150 constitutes the manipulation input surface. In a case where the touch panel 150 is the capacitance type, the top panel 120 as illustrated in FIGS. 2 and 3 may be omitted. In this case, the surface of the touch panel 150 constitutes the manipulation input surface. In this case, the vibrating element 140 vibrates the manipulation input surface at a natural vibration frequency of a member having the manipulation input surface.

The display panel 160 is a display part which displays a picture image. The display panel 160 may be a liquid crystal display panel, an organic Electroluminescence (EL) panel or the like, for example. The display panel 160 is disposed in the concave portion 110A of the housing 110 and is disposed on (the positive side in Z axis direction of) the substrate 170.

The display panel 160 is driven by a driver Integrated Circuit (IC) and displays the GUI input part, the picture image, characters, symbols, graphics or the like in accordance with an operating state of the electronic device 100.

The substrate 170 is disposed in the concave portion 110A of the housing 110. The display panel 160 and the touch panel 150 are disposed on the substrate 170. The display panel 160 and the touch panel 150 are fixed to the substrate 170 and the housing 110 by a holder or the like (not shown).

On the substrate 170, a drive control apparatus which will be described hereinafter and circuits or the like that are necessary for driving the electronic device 100 are mounted.

In the electronic device 100 having the configuration as described above, when the user touches the top panel 120 with the fingertip and a movement of the fingertip is detected, the drive controller mounted on the substrate 170 drives the vibrating element 140 so that the top panel 120 vibrates at a frequency in the ultrasound-frequency-band. The frequency in the ultrasound-frequency-band is a resonance frequency of a resonance system including the top panel 120 and the vibrating element 140. A standing wave is generated in the top panel 120 at the frequency.

The electronic device 100 generates the standing wave in the ultrasound-frequency-band in the top panel 120 and provides a tactile sensation (haptic sensation) to the user through the top panel 120

Next, the standing wave generated in the top panel 120 is described with reference to FIG. 4.

Figure 4:
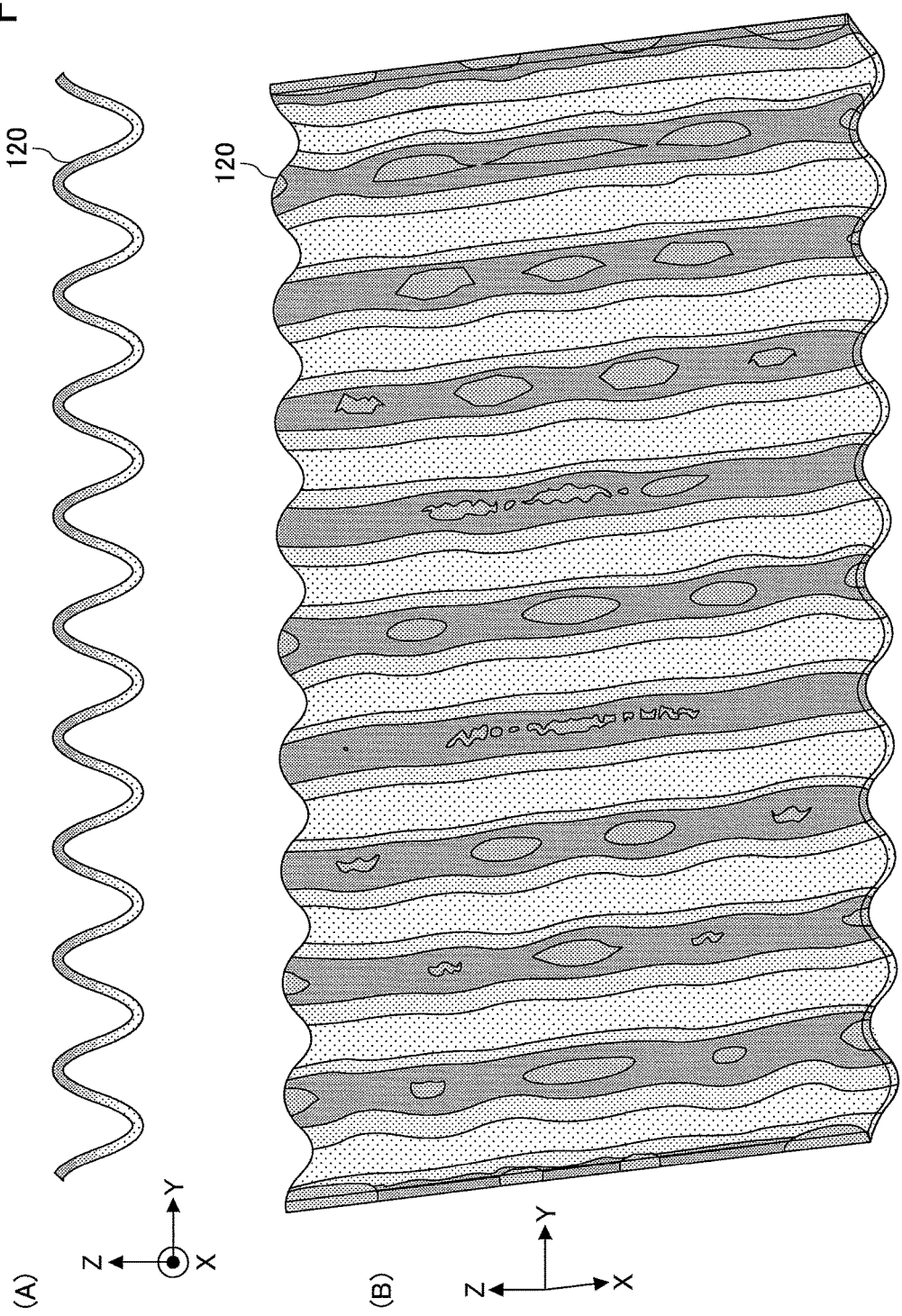
FIG. 4 is a diagram illustrating crests and troughs of a standing wave formed in parallel with the short side of a top panel.

FIG. 4 is a diagram illustrating crests and troughs of the standing wave formed in parallel with the short side of the top panel 120 included in the standing waves generated in the top panel 120 by the natural vibration at the ultrasound-frequency-band. A part (A) of FIG. 4 illustrates a side view, and a part (B) of FIG. 4 illustrates a perspective view. In parts (A) and (B) of FIG. 4, a XYZ coordinate system similar to that described in FIGS. 2 and 3 is defined. In parts (A) and (B) of FIG. 4, the amplitude of the standing wave is overdrawn in an easy-to-understand manner. The vibrating element 140 is omitted in parts (A) and (B) of FIG. 4.

The natural vibration frequency (the resonance frequency) f of the top panel 120 is represented by formulas (1) and (2) where E is the Young's modulus of the top panel 120, ρ is the density of the top panel 120, δ is the Poisson's ratio of the top panel 120, l is the long side dimension of the top panel 120, t is the thickness of the top panel 120, and k is a periodic number of the standing wave along the direction of the long side of the top panel 120. Since the standing wave has the same waveforms in every half cycle, the periodic number k takes values at 0.5 intervals. The periodic number k takes 0.5, 1, 1.5, 2 •••

$$f = \frac{\pi k^2 t}{l^2} \sqrt{\frac{E}{3\rho(1-\delta^2)}} \qquad (1)$$

$$f = \alpha k^2 \qquad (2)$$

The coefficient a included in formula (2) corresponds to coefficients other than $k^2$ included in formula (1).

A waveform of the standing wave as illustrated in parts (A) and (B) of FIG. 4 is obtained in a case where the periodic number k is 10, for example. In a case where a sheet of Gorilla (registered trademark) glass of which the length l of the long side is 140 mm, the length of the short side is 80 mm, and the thickness t is 0.7 mm is used as the top panel 120, for example, the natural vibration number f is 33.5 kHz, if the periodic number k is 10. In this case, a frequency of the drive signal is 33.5 kHz.

The top panel 120 is a planar member. If the vibrating element 140 (see FIGS. 2 and 3) is driven and the natural vibration at the ultrasound-frequency-band is generated in the top panel 120, the top panel 120 is bent as illustrated in parts (A) and (B) of FIG. 4. As a result, the standing wave is generated in the top panel 120.

In the present embodiment, the single vibrating element 140 is bonded on the surface of the top panel 120 which is located on the negative side in Z axis direction at the location along the short side extending in X axis direction at the positive side in Y axis direction. The electronic device 100 may include two vibrating elements 140. In a case where the electronic device 100 includes two vibrating elements 140, another vibrating element 140 may be bonded on the surface of the top panel 120 which is located on the negative side in Z axis direction at a location along the short side extending in X axis direction at a negative side in Y axis direction. In this case, the two vibrating elements 140 are disposed at locations that are axially symmetric with respect to a center line of the top panel 120 parallel to the two short sides of the top panel 120.

In a case where the electronic device 100 includes two vibrating elements 140, the two vibrating elements 140 are driven in the same phase, if the periodic number k is an integer number. If the periodic number k is a decimal fraction, the two vibrating elements 140 are driven in opposite phases.

Next, the natural vibration at ultrasound-frequency-band generated in the top panel 120 of the electronic device 100 is described with reference to FIG. 5.

Figure 5:
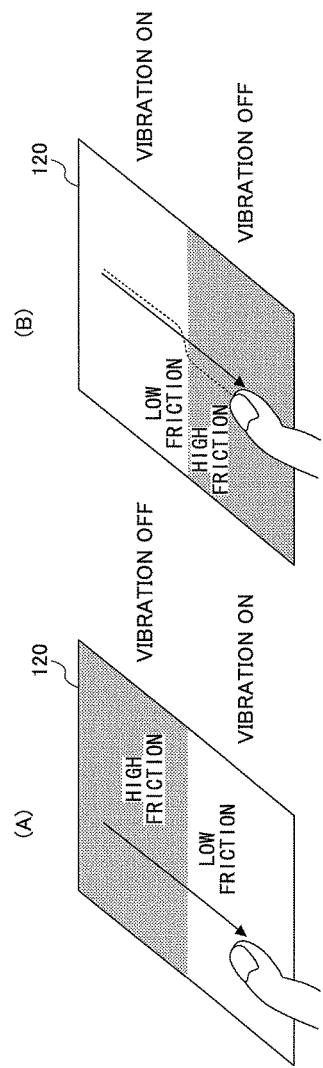
FIG. 5 is a diagram illustrating cases where a kinetic friction force applied to a fingertip varies when the natural vibration at the ultrasound-frequency-band is generated in the top panel of the electronic device.

FIG. 5 is a diagram illustrating cases where a kinetic friction force applied to the fingertip varies when the natural vibration at the ultrasound-frequency-band is generated in the top panel 120 of the electronic device 100. In FIG. 5, the manipulation input is performed with the fingertip. In parts (A) and (B) of FIG. 5, the user touches the top panel 120 with the fingertip and performs the manipulation input by tracing the top panel 120 with the fingertip in a direction from a far side to a near side with respect to the user. An on/off state of the vibration is switched by controlling an on/off state of the vibrating element 140 (see FIGS. 2 and 3).

In parts (A) and (B) of FIG. 5, areas in which the fingertip touches while the vibration is turned off are indicated in grey in the direction from the far side to the near side. Areas in which the fingertip touches while the vibration is turned on are indicated in white in the direction from the far side to the near side.

As illustrated in FIG. 4, the natural vibration at the ultrasound-frequency-band occurs on an entire surface of the top panel 120. Parts (A) and (B) of FIG. 5 illustrate operation patterns in which the on/off state of the natural vibration is switched while the fingertip of the user is tracing the top panel 120 in the direction from the far side to the near side.

Accordingly, in parts (A) and (B) of FIG. 5, the areas in which the fingertip touches while the vibration is turned off are indicated in grey in the direction from the far side to the near side. The areas in which the fingertip touches while the vibration is turned on are indicated in white in the direction from the far side to the near side.

In the operation pattern as illustrated in part (A) of FIG. 5, the vibration is turned off when the fingertip of the user is located on the far side of the top panel 120, and the vibration is turned on in the process of tracing the top panel 120 with the fingertip toward the near side.

On the contrary, in the operation pattern as illustrated in part (B) of FIG. 5, the vibration is turned on when the fingertip of the user is located on the far side of the top panel 120, and the vibration is turned off in the process of tracing the top panel 120 with the fingertip toward the near side.

In a state where the natural vibration at the ultrasound-frequency-band is generated in the top panel 120, a layer of air intervenes between the surface of the top panel 120 and the fingertip. The layer of air is provided by a squeeze film effect. As a result, a kinetic friction coefficient on the surface of the top panel 120 is decreased when the user traces the surface with the fingertip.

Accordingly, in the grey area located on the far side of the top panel 120 as illustrated in part (A) of FIG. 5, the kinetic friction force applied to the fingertip becomes larger. In the white area located on the near side of the top panel 120, the kinetic friction force applied to the fingertip becomes smaller.

Therefore, the user who is performing the manipulation input to the top panel 120 in a manner as illustrated in part (A) of FIG. 5 senses a reduction of the kinetic friction force applied to the fingertip when the vibration is turned on. As a result, the user senses a slippery or smooth touch (texture) with the fingertip. In this case, the user senses as if a concave portion is provided on the surface of the top panel 120 when the surface of the top panel 120 becomes slippery and the kinetic friction force becomes lower.

On the contrary, in the white area located on the far side of the top panel 120 as illustrated in part (B) of FIG. 5, the kinetic friction force applied to the fingertip becomes smaller. In the grey area located on the near side of the top panel 120, the kinetic friction force applied to the fingertip becomes higher.

Therefore, the user who is performing the manipulation input in the top panel 120 in a manner as illustrated in part (B) of FIG. 5 senses an increase of the kinetic friction force applied to the fingertip when the vibration is turned off. As a result, the user senses a grippy or scratchy touch (texture) with the fingertip. In this case, the user senses as if a convex portion is provided on the surface of the top panel 120 when the surface of the top panel 120 becomes grippy and the kinetic friction force becomes higher.

Accordingly, the user can sense a concavity or convexity with the fingertip in cases as illustrated in parts (A) and (B) of FIG. 5. For example, "The Printed-matter Typecasting Method for Haptic Feel Design and Sticky-band Illusion" (The collection of papers of the 11$^{th}$ SICE system integration division annual conference (SI2010, Sendai)_174-177, 2010-12) discloses that a human can sense a concavity or a convexity. "Fishbone Tactile Illusion"(Collection of papers of the 10th Congress of The Virtual Reality Society of Japan (September, 2005)) discloses that a human can sense a concavity or a convexity as well.

Although a variation of the kinetic friction force when the vibration is switched on or off is described above, a variation of the kinetic friction force similar to those described above is obtained when the amplitude (intensity) of the vibrating element 140 is varied.

In the following, a configuration of the electronic device 100 according to the embodiment is described with reference to FIG. 6. Hereinafter, driving waveform used for driving the vibrating element 140 of the electronic device 100 will be described with reference to FIG. 7 in addition to FIG. 6.

Figure 6:
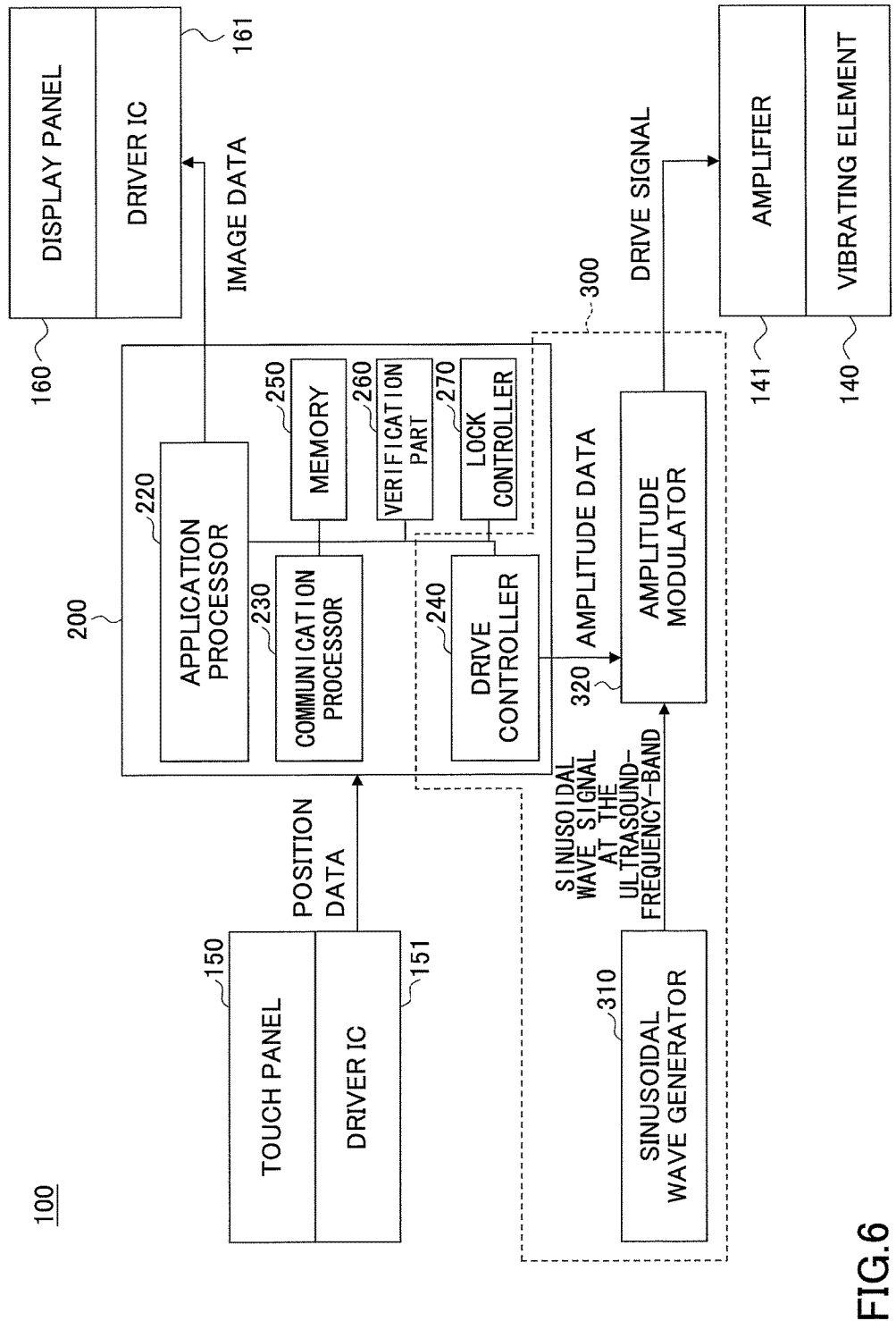
FIG. 6 is a diagram illustrating a configuration of the electronic device according to the embodiment.
Figures 7, 8:
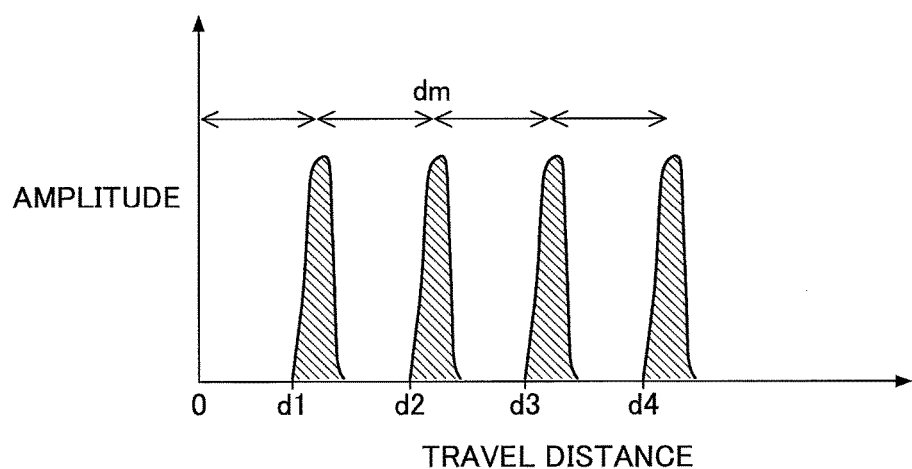
FIG. 7 is a diagram illustrating a driving waveform used for driving a vibrating element of the electronic device.
FIG. 8 is a diagram illustrating a passcode data stored in a memory.

FIG. 6 is a diagram illustrating the configuration of the electronic device 100 according to the embodiment. FIG. 7 is a diagram illustrating a driving waveform used for driving the vibrating element 140 of the electronic device 100.

In FIG. 7, a horizontal axis indicates a travel distance of a position of the manipulation input, and a vertical axis indicates amplitude of the drive signal that causes the vibrating element 140 to vibrate.

The electronic device 100 includes the vibrating element 140, an amplifier 141, the touch panel 150, a driver Integrated Circuit (IC) 151, the display panel 160, a driver IC 161, a controller 200, a sinusoidal wave generator 310 and the amplitude modulator 320.

The controller 200 includes an application processor 220, a communication processor 230, a drive controller 240, a memory 250, a verification part 260 and a lock controller 270. The controller 200 is realized by an IC chip, for example.

The drive controller 240, the sinusoidal wave generator 310 and the amplitude modulator 320 constitute a drive control apparatus 300. Although an embodiment in which the application processor 220, the communication processor 230, the drive controller 240, the memory 250, the verification part 260 and the lock controller 270 are included in the single controller 200 is described, the drive controller 240 may be disposed outside of the controller 200 and realized by another IC chip or a processor. In this case, data which is necessary for a drive control performed by the drive controller 240 among data stored in the memory 250 may be stored in another memory disposed in the drive control apparatus 300.

In FIG. 6, the housing 110, the top panel 120, the double-faced adhesive tape 130 and the substrate 170 (see FIG. 2) are omitted. Herein, the amplifier 141, the driver IC 151, the driver IC 161, the drive controller 240, the memory 250, the verification part 260, the lock controller 270, the sinusoidal wave generator 310 and the amplitude modulator 320 are described.

The amplifier 141 is disposed between the drive control apparatus 300 and the vibrating element 140. The amplifier 141 amplifies the drive signal output from the drive control apparatus 300 and drives the vibrating element 140.

The driver IC 151 is connected to the touch panel 150. The driver IC 151 detects position data representing the position on the touch panel 150 at which the manipulation input is performed and outputs the position data to the controller 200. As a result, the position data is input to the application processor 220 and the drive controller 240. Inputting the position data to the drive controller 240 is equal to inputting the position data to the drive control apparatus 300.

The driver IC 161 is connected to the display panel 160 and receives image data output from the drive control apparatus 300. The driver IC 161 outputs the image data to the display panel 160 and displays a picture image to the display panel 160 based on the image data. A GUI input part, an image or the like is displayed on the display panel 160 based on the image data.

The application processor 220 executes various application programs included in the electronic device 100. The application processor 220 executes a predetermined designated application upon receiving a second signal from the verification part 260. The second signal represents that a verification of a second passcode that will be described later is successfully completed. The application processor 220 is one example of an application executing part.

The communication processor 230 performs processes that are necessary for communications of 3rd Generation (3G), 4th Generation (4G), Long Term Evolution (LTE), WiFi or the like of the electronic device 100.

The drive controller 240 outputs amplitude data to the amplitude modulator 320 in response to presence or absence of the manipulation input and the travel distance of the position of the manipulation input. The amplitude data represents an amplitude value used for controlling an intensity of the drive signal used for driving the vibrating element 140.

The drive controller 240 switches on and off the vibrating element 140 every time the travel distance of the position of the manipulation input reaches a unit travel distance when the user touches the top panel 120 in order to input the first passcode and the second passcode. The user inputs the first passcode and the second passcode when the user turns on the electronic device 100. The kinetic friction force applied to the fingertip of the user varies when the vibration of the top panel 120 is switched on and off. The reason why the drive controller 240 switches on and off the vibrating element 140 as described above is for the sake of informing the user of the manipulation through the tactile sensation.

The drive controller 240 switches on and off the vibrating element 140 in response to the travel distance of the position of the manipulation input as illustrated in FIG. 7, for example. In FIG. 7, the drive controller 240 switches on for a moment every time the travel distance of the position of the manipulation input reaches a unit travel distance dm. Accordingly, the user obtains the tactile sensation of the concavity and the convexity every time the user moves the position of the manipulation input over the unit travel distance dm. The tactile sensation of the concavity and the convexity provides the user with a clicky sensation as if the user manipulates a so-called metal dome button.

The vibrating element 140 is turned on for a moment when the travel distance of the position of the manipulation input reaches the unit travel distance dm. The user obtains the tactile sensation of the concavity with the fingertip when the vibrating element 140 is switched on and the next moment the user obtains the tactile sensation of the convexity with the fingertip when the vibrating element 140 is switched off. Accordingly, it becomes possible to provide the tactile sensation of the concavity and the convexity with the user's fingertip by switching on the vibrating element 140 for a moment as illustrated in FIG. 7.

According to the electronic device 100 of the embodiment, a numerical value of a first digit of the first passcode, a numerical value of a second digit of the first passcode and a numerical value of the second passcode are input by the user by a number of times that the drive controller 240 switches on and off the vibrating element 140 when the fingertip moves in a certain definite direction while touching the top panel 120. The user inputs the first passcode and the second passcode while counting a number of the concavity and the convexity provided to the fingertip.

A value representing the unit travel distance dm may be stored by the drive controller 240. Alternatively, data representing the unit travel distance dm may be stored in the memory 250.

The memory 250 stores passcode data in which data representing the first passcode, first direction data, second direction data, data representing the second passcode and third direction data are associated with each other.

The memory 250 stores data and programs that are necessary for the application processor 220 to execute the application program and data and programs that are necessary for the communication processor 230 to perform a communication processing. In addition to this, the memory 250 stores data representing the first passcode that is necessary for unlocking the electronic device 100 and data representing the second passcode that is used for activating a designated application. The memory 250 is one example of a first memory and a second memory.

A lock function of the electronic device 100 requires the user to input the first passcode when turning on the electronic device 100 and unlocks the electronic device 100 if the first passcode is input through the touch panel 150 successfully. Then the electronic device 100 becomes an operational state. If the first passcode is input incorrectly by the user, the verification of the first passcode is not successfully completed. The electronic device 100 maintains a locked state. In this case, the electronic device 100 does not become the operational state. The lock controller 270 performs the lock function as described above.

In a state where the application processor 220 causes the electronic device 100 to perform an operation mode which requires the user to input the first passcode or the second passcode, the verification part 260 performs a verification process in which the verification part 260 verifies the first passcode or the second passcode input by the user when turning on the electronic device 100. The verification part 260 transmits a signal representing a verification result to the lock controller 270 or the application processor 220. The verification part 260 is one example of a first verification part and a second verification part.

The verification part 260 counts a number of times that the drive controller 240 switches on the vibration in response to the manipulation input performed by the user when the user inputs the first passcode or the second passcode. The verification part 260 determines a travel direction of the manipulation input based on a positional change of the manipulation input. The verification part 260 identifies the numerical value and the direction that are input as the first passcode or the second passcode by the user. The numerical value corresponds to the number of times that the vibration is switched on when the fingertip moves in a certain definite direction while touching the top panel 120. The number of times the vibration is switched on is determined based on the drive signal output from the drive controller 240.

When the first passcode is input on the touch panel 150 by the user, the verification part 260 verifies the input first passcode with the first passcode stored in the memory 250. If the verification of the first passcode is successfully completed, the verification part 260 outputs a first signal indicating the successful completion of the first passcode to the controller 270.

In a case where the user inputs the first passcode to the touch panel 150 and the verification of the first passcode is successfully completed, and then the second passcode is input to the touch panel 150 by the user, the verification part 260 verifies the input second passcode with the second passcode stored in the memory 250. If the verification of the second passcode is successfully completed, the verification part 260 outputs a second signal indicating the successful completion of the second passcode to the controller 220. When the second signal is input from the verification part 260, the application processor 220 executes a predetermined designated application.

The lock controller 270 is a controller that realizes the lock function of the electronic device 100. When the first signal indicating the successful completion of the first passcode is input from the verification part 260, the lock controller 270 unlocks the electronic device 100 and puts the electronic device 100 to the operational state.

The lock controller 270 keeps the electronic device 100 locked and puts the electronic device 100 to a non-operational state unless the first signal is input from the verification part 260. The lock controller 270 puts the electronic device 100 to one of a locked state and an unlocked state. The lock controller 270 is one example of an unlocking part.

The sinusoidal wave generator 310 generates sinusoidal waves used for generating the drive signal which causes the top panel 120 to vibrate at the natural vibration number. For example, when causing the top panel 120 to vibrate at a natural vibration frequency f of 33.5 kHz, the frequency of the sinusoidal wave is 33.5 kHz. The sinusoidal wave generator 310 inputs a sinusoidal wave signal at the ultrasound-frequency-band to the amplitude modulator 320.

The amplitude modulator 320 generates the drive signal by modulating an amplitude of the sinusoidal wave signal input from the sinusoidal wave generator 310 based on the amplitude data input from the drive controller 240. The amplitude modulator 320 modulates only the amplitude of the sinusoidal wave signal at the ultrasound-frequency-band input from the sinusoidal wave generator 310 and does not modulate a frequency and a phase of the sinusoidal wave signal in order to generate the drive signal.

Therefore, the drive signal output from the amplitude modulator 320 is a sinusoidal wave signal at the ultrasound-frequency-band obtained by modulating only the amplitude of the sinusoidal wave signal at the ultrasound-frequency-band output from the sinusoidal wave generator 310. In a case where the amplitude data is zero, the amplitude of the drive signal becomes zero. This is the same as the amplitude modulator 320 not outputting the drive signal.

In the following, the passcode data stored in the memory 250 is described with reference to FIG. 8.

Figure 9:
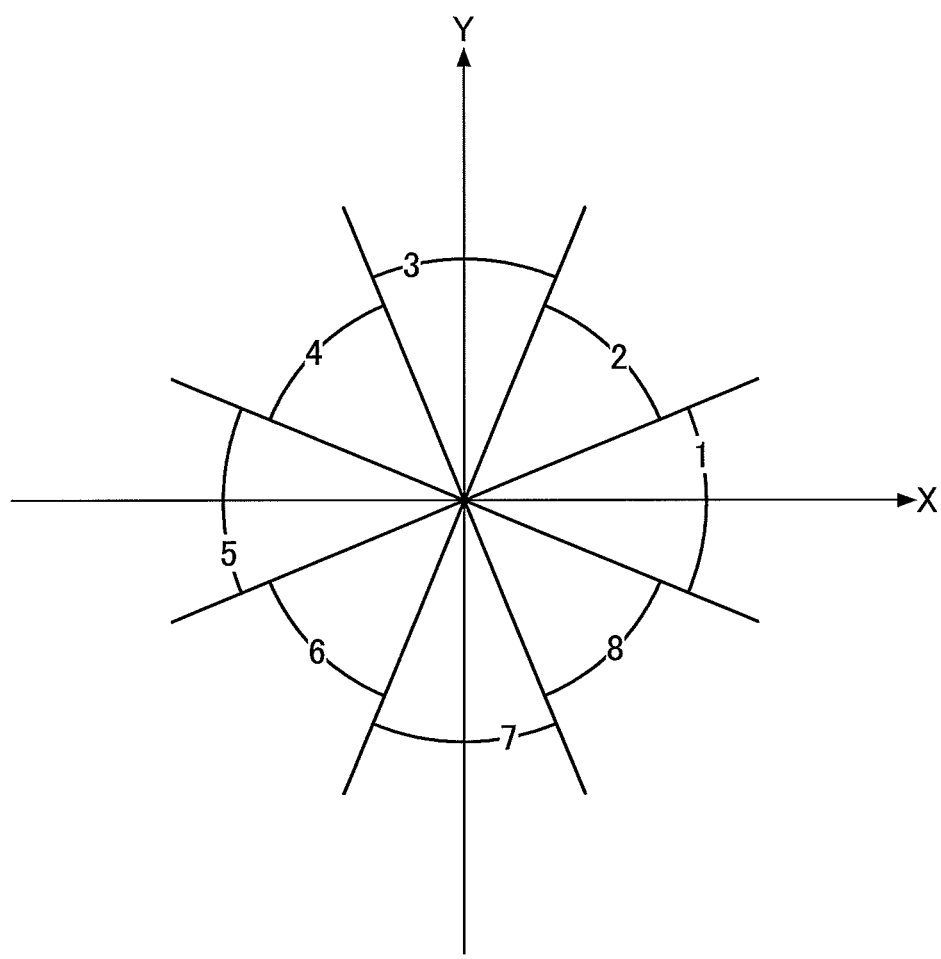
FIG. 9 is a diagram illustrating angular ranges represented by a first direction data, a second direction data and a third direction data included in the passcode data as illustrated in FIG. 8.

FIG. 8 is a diagram illustrating the passcode data stored in the memory 250. FIG. 9 is a diagram illustrating angular ranges represented by the first direction data, the second direction data and the third direction data included in the passcode data as illustrated in FIG. 8.

As illustrated in FIG. 8, the data representing the first passcode, the first direction data, the second direction data, the data representing the second passcode and the third direction data are associated with each other in the passcode data stored in the memory 250.

FIG. 8 illustrate an embodiment in which numerical values of two digits of the first passcode are '2' and '1' and a numerical value of a digit of the second passcode is '3'. The first direction data represents a direction in which the numerical value '2' of the first digit of the first passcode is to be input. The second direction data represents a direction in which the numerical value '1' of the second digit of the first passcode is to be input. The third direction data represents a direction in which the numerical value '3' of the digit of the second passcode is to be input. Herein, among the numerical values '2' and '1' of the two digits of the first passcode, the numerical value '2' located on the left is addressed as the first digit and the numerical value '1' located on the right is addressed as the second digit.

The user inputs the numerical values of the first digit of the first passcode, the second digit of the first passcode, and the second passcode by the number of times that the drive controller 240 switches on and off the vibration when the fingertip moves in the certain definite direction while touching the top panel 120. The numerical values input by the user as the first digit of the first passcode, the second digit of the first passcode and the second passcode are verified with the first digit of the first passcode, the second digit of the first passcode and the second passcode included in the passcode data, respectively.

The direction in which the user moves the position of the manipulation input in order to input the first digit of the first passcode is verified with the first direction data. The direction in which the user moves the position of the manipulation input in order to input the second digit of the first passcode is verified with the second direction data. The direction in which the user moves the position of the manipulation input in order to input the second passcode is verified with the third direction data.

Each of the first direction data, the second direction data and the third direction data represents that a direction of a vector whose starting point is an original point in XY plane is classified into either one of the eight angular ranges 1 to 8 as illustrated in FIG. 9. Angle of each of the eight angular ranges 1 to 8 is 45 degrees obtained by dividing 360 degrees by eight. The angular ranges 1 to 8 are based on a manner that degrees is defined in X-axis positive direction and angle is defined in a counterclockwise fashion.

The angular range 1 is greater than 337.5 degrees and less than or equal to 22.5 degrees. The angular range 2 is greater than 22.5 degrees and less than or equal to 67.5 degrees. The angular range 3 is greater than 67.5 degrees and less than or equal to 112.5 degrees. The angular range 4 is greater than 112.5 degrees and less than or equal to 157.5 degrees. The angular range 5 is greater than 157.5 degrees and less than or equal to 202.5 degrees. The angular range 6 is greater than 202.5 degrees and less than or equal to 247.5 degrees. The angular range 7 is greater than 247.5 degrees and less than or equal to 292.5 degrees. The angular range 8 is greater than 292.5 degrees and less than or equal to 337.5 degrees.

According to the passcode data as illustrated in FIG. 8, the first direction data, the second direction data and the third direction data are set to the angular range 3, the angular range 1 and the angular range 7, respectively. Accordingly, if a direction in which numerical value '2' of the first digit of the first passcode is input falls within the angular range 3, the input of the first digit of the first passcode is valid.

If a direction in which numerical value '1' of the second digit of the first passcode is input falls within the angular range 1, the input of the second digit of the first passcode is valid. If a direction in which numerical value '3' of the second passcode is input falls within the angular range 7, the input of the second passcode is valid.

In a case where the first digit of the first passcode input by the user has less numerical value or more numerical value, the input numerical value does not coincide with the numerical value included in the passcode data and thus the input becomes invalid. In a case where the second digit of the first passcode input by the user has less numerical value or more numerical value, the input numerical value does not coincide with the numerical value included in the passcode data and thus the input becomes invalid. In a case where the second passcode input by the user has less numerical value or more numerical value, the input numerical value does not coincide with the numerical value included in the passcode data and thus the input becomes invalid.

Accordingly, in a case where the numerical values of the first digit of the first passcode, the second digit of the first passcode and the second passcode are input correctly by the user and the directions of the inputs fall within the angular ranges represented by the direction data, respectively, the inputs become valid.

Although the embodiment in which the first direction data, the second direction data and the third direction data are set to the angular range 3, the angular range 1 and the angular range 7, respectively, is described, each direction data may be set to any angular range among the angular ranges 1 to 8. The numerical values of the first digit of the first passcode, the second digit of the first passcode and the second passcode input by the user are treated as valid input data as long as the user inputs the numerical values in the directions that fall within the angular ranges determined by the first direction data, second direction data and third direction data, respectively. Otherwise the numerical values input by the user are treated as invalid input data.

The vibration of the top panel 120 is switched on during a period of time in which the user's fingertip touches the top panel 120. Every time the user's fingertip moves a designated travel distance while touching the top panel 120, the drive controller 240 switches on and off the vibration.

If the drive controller 240 switches on and off the vibration only once, the tactile sensation representing the concavity and the convexity is provided for the user's fingertip only once. Accordingly, the user can input the first passcode and the second passcode by performing the manipulation input (drag operation) in designated directions while counting the number of times that the user feels the concavity and the convexity with the fingertip.

Accordingly, in a case where the passcode data as illustrated in FIG. 8 is set, the user has to perform the manipulation input (drag operation) as follows in order to input the first passcode and the second passcode correctly.

When turning on the electronic device 100, the user can input the numerical value '2' of the first digit of the first passcode by moving the fingertip in Y-axis positive direction until the user feels the concavity and the convexity twice with the fingertip touching the top panel 120. Y-axis positive direction falls within the angular range 3 represented by the first direction data.

After inputting the numerical value '2' of the first digit of the first passcode, the user changes travel direction of the fingertip to X-axis positive direction and can input the numerical value '1' of the second digit of the first passcode by moving the fingertip until the user feels the concavity and the convexity once with the fingertip while touching the top panel 120. X-axis positive direction falls within the angular range 1 represented by the second direction data.

After inputting the numerical value '1' of the second digit of the first passcode, the user changes the travel direction of the fingertip to Y-axis negative direction and can input the numerical value '3' of the second passcode by moving the fingertip until the user feels the concavity and the convexity thrice with the fingertip while touching the top panel 120. Y-axis negative direction falls within the angular range 7 represented by the second direction data.

Upon completing the verification of the first passcode successfully, the verification part 260 outputs the first signal to the lock controller 270. Then the lock controller 270 unlocks the electronic device 100 and puts the electronic device 100 to the operational state.

Upon completing the verification of the second passcode successfully, the verification part 260 outputs the second signal to the application processor 220. Then the application processor 220 executes one or more predetermined designated applications.

The user of the electronic device 100 can set the first passcode, the direction represented by the first direction data, the direction represented by the second direction data, the second passcode, and the direction represented by the third direction data, in advance.

The user can set the first passcode and the second passcode by selecting the numerical values in a state where the display panel 160 displays the GUI input parts representing numeric keys and by inputting the numerical values of the first passcode and the second passcode. The user can select and input the numerical values by performing the manipulation input. In addition to this, the display panel 160 displays the GUI input parts used for selecting the angular ranges of the first passcode and the second passcode so that the user can input the angular ranges.

Alternatively, the electronic device 100 may require the user to input the first passcode and the second passcode in a way that is similar to the way in which the user input the first passcode and the second passcode in order to unlock the electronic device 100 in a practical manner. The user may select an application that the user uses with high frequency and set the application as the designated application, for example.

The reason that angular ranges 1 to 8 which may be included in the first direction data, the second direction data and the third direction data have 45 degree ranges is for the sake of taking into account the user's hand movement that may occur when performing the manipulation input. Although the embodiment in which the eight angular ranges have 45 degree ranges, respectively, is described, the number of the angular ranges is not limited to eight. For example, the angular ranges may have 90 degree ranges or 30 degree ranges.

In this embodiment, the passcode data includes the data representing the first passcode, the first direction data, the second direction data, the data representing the second passcode, and the third direction data.

However, the passcode data may have simpler data configuration. For example, the first direction data and the second direction data may not be associated with numerical values of the first digit and the second digit of the first passcode. For example, angle data that represents an angle between the direction of inputting the first digit and the direction of inputting the second digit may be associated with the first passcode. In this case, number of the angle data associated with the first passcode can be reduced to one. Further, in this case, the verification part 260 verifies an angle between the directions of the first digit and the second digit input by the user with the angle represented by the angle data. The direction in which the first digit is input by the user may be any direction.

The third direction data representing the direction of inputting the second passcode may be angle data which represents angular range between the direction of inputting the second digit and the direction of inputting the second passcode.

In the following, processes executed by the drive controller 240 of the drive control apparatus 300 included in the electronic device 100 according to the embodiment are described with reference to FIG. 10.

Figure 10:
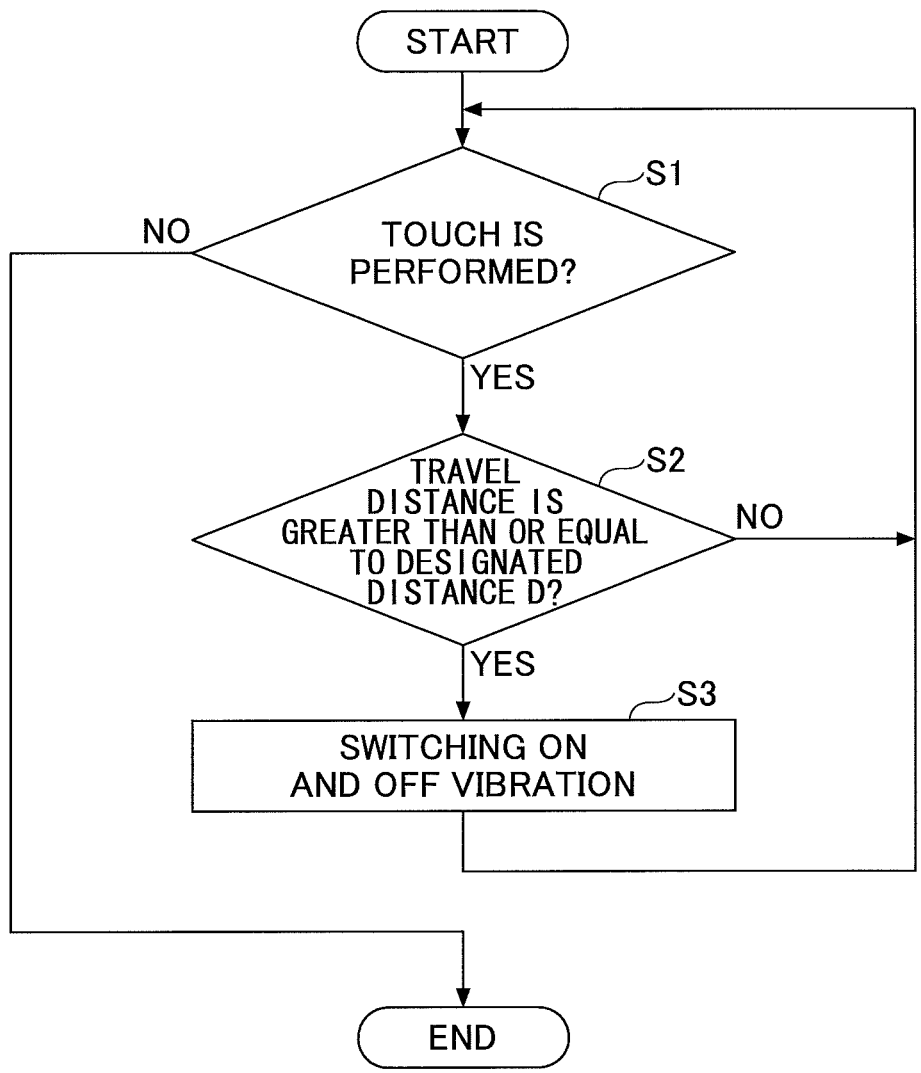
FIG. 10 is a diagram illustrating a flowchart executed by a drive controller of a drive control apparatus included in the electronic device according to the embodiment.

FIG. 10 is a diagram illustrating a flowchart executed by the drive controller 240 of the drive control apparatus 300 included in the electronic device 100 according to the embodiment.

An Operating System (OS) of the electronic device 100 performs control for driving the electronic device 100 at every designated control cycle. Therefore, the drive control apparatus 300 performs calculation every control cycle. The same applies to the drive controller 240. The drive controller 240 executes process flow as illustrated in FIG. 10 at every control cycle, repeatedly.

Suppose that the period of time required from the point in time when the position data is input to the drive control apparatus 300 to the point in time when the drive signal is calculated by the drive controller 240 based on the position data is $\Delta t$, the required period of time $\Delta t$ is almost equal to a period of the single control cycle.

A period of time of one cycle of the control cycle can be treated as a period of time corresponding to the required period of time $\Delta t$ which is required from the point in time when the position data is input to the drive control apparatus 300 from the driver IC 151 to the point in time when the drive signal is calculated based on the position data.

The drive controller 240 starts processing when the electronic device 100 is turned on.

The drive controller 240 determines whether the touch is performed (step S1). Presence or absence of the touch is determined based on whether the position data is input to the drive controller 240 from the driver IC 151 (see FIG. 6).

At step S1, if the drive controller 240 determines that the touch is performed (S1: YES), the drive controller 240 determines whether the travel distance of the position data is greater than or equal to the designated distance D (step S2). The travel distance of the position data is obtained as a difference between the position data obtained at step S1 of the previous control cycle and the position data obtained at step S1 of the present control cycle.

Since the flow as illustrated in FIG. 10 is repeatedly executed by the OS of the electronic device 100 at every control cycle, the drive controller 240 calculates the travel distance of the position data based on the difference between the position data obtained at step S1 of the previous control cycle and the position data obtained at step S1 of the present control cycle. The drive controller 240 determines whether the calculated travel distance of the position data is greater than or equal to the designated distance D.

If the drive controller 240 determines that the travel distance of the position data is greater than or equal to the designated distance D (S2: YES), the drive controller 240 switches on and off the vibrating element 140 (step S3). The process at step S3 is performed by switching on and off the vibrating element 140 in order to change the tactile sensation provided to the user's fingertip when the travel distance of the manipulation input becomes greater than or equal to the designated distance D corresponding to the unit travel distance dm. The tactile sensation is changed.

For example, in a case where the vibrating element 140 is switched off, it is possible to provide the tactile sensation of the convexity to the user's fingertip. On the contrary, in a case where the vibrating element 140 is switched on, it is possible to provide the tactile sensation of the concavity to the user's fingertip.

The tactile sensation provided to the user's fingertip touching the top panel 120 is changed by switching on and off the vibrating element 140. As a result, the user recognizes that the travel distance of the manipulation input reaches the unit travel distance dm through the tactile sensation.

The drive controller 240 returns the flow to step S1 upon finishing the process at step S3.

At step S2, if the drive controller 240 determines that the travel distance of the position data is not greater than or equal to the designated distance D (S2: NO), the drive controller 240 returns the flow to step S1. In a case where the travel distance does not reach the designated distance D, there is a possibility that the user finishes the manipulation input or the user changes the direction of the movement of the manipulation input. Therefore, in this case, the drive controller 240 returns the flow to step S1 in order to determine the presence or absence of the touch.

At step S1, if the drive controller 240 determines that the touch is not performed (S1: NO), the drive controller 240 finishes the drive control constituted by the flow as illustrated in FIG. 10 (END). In a case where the drive controller 240 is driving the vibrating element 140 before determining that the touch is not performed, the drive controller 240 stops driving the vibrating element 140. In order to stop driving the vibrating element 140, the drive controller 240 sets the amplitude value of the drive signal to zero.

The control processes as illustrated in FIG. 10 are repeatedly performed at every control cycle. Every time the travel distance reaches the unit travel distance dm while the user moves the fingertip touching the GUI input parts or the like, the vibration of the top panel 120 is switched on and off. Therefore, it is possible to provide the tactile sensation of the convexity or the concavity to the user's fingertip and to make the user recognize that the travel distance reaches the unit travel distance dm through the tactile sensation.

If the user gets their fingertip off of the top panel 120, the drive controller 240 finishes all of the processes.

The first passcode and the second passcode are input by the user, as the drive controller 240 performs the above control processes based on the user's manipulation input. The numerical values input as the first passcode and the second passcode by the user correspond to the number of times that the drive controller 240 switches on and off the vibration while the fingertip touching the top panel 120 moves in the certain definite direction.

The verification part 260 counts the number of times that the drive controller 240 switches on and off the vibration and determines the travel direction of the manipulation input based on the position data. By counting the number of times and determining the travel direction, the verification part 260 recognizes the numerical values and the directions input by the user.

The verification part 260 verifies the first passcode. If the verification of the first passcode is successfully completed, the verification part 260 outputs the first signal to the lock controller 270. The verification part 260 verifies the second passcode. If the verification of the second passcode is successfully completed, the verification part 260 outputs the second signal to the application processor 220.

According to the embodiment as described above, the user inputs the first passcode and the second passcode. However, the user may input only the first passcode. In this case, if the user inputs only the first passcode, the verification part 260 finishes the processes without outputting the second signal.

Figure 11:
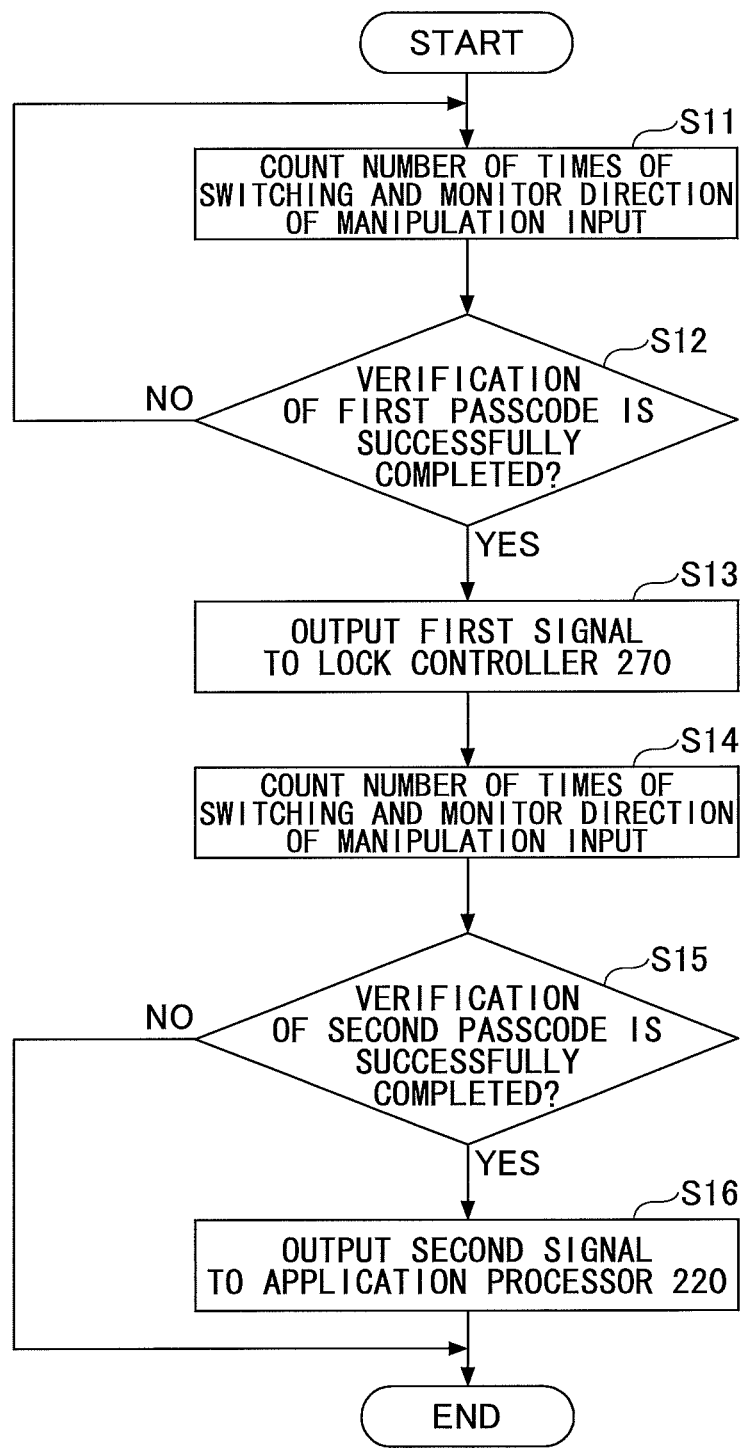
FIG. 11 is a diagram illustrating a flowchart of a verification processes executed by a verification part of the drive control apparatus included in the electronic device according to the embodiment.

FIG. 11 is a diagram illustrating a flowchart of the verification processes executed by the verification part 260 of the drive control apparatus 300 included in the electronic device 100 according to the embodiment.

Upon starting the processes, the verification part 260 counts the number of times the drive controller 240 switches on and off the vibration based on the drive signal output from the drive controller 240 and monitors the direction of the manipulation input based on the position data output from the driver IC 151 for the sake of verifying the first passcode (step S11). The direction of the manipulation input is a direction in which the user performs the drag operation.

The travel direction of the manipulation input performed for inputting the first digit of the first passcode and the travel direction of the manipulation input performed for inputting the second digit of the first passcode are different with each other. Accordingly, the verification part 260 recognizes a number of counts obtained after starting the count process and before the direction of the manipulation input is changed as the first digit and recognizes a number of counts obtained after the direction of the manipulation input is changed as the second digit, for example.

For example, the verification part 260 recognizes the direction of the manipulation input based on the position data obtained when the manipulation input is performed at first and the position data obtained when the vibration is switched on and off.

In particular, based on the position data obtained when the manipulation input is performed at first and the position data obtained when the vibration is switched on and off, the verification part 260 recognizes the direction of the manipulation input as follows.

In a case where there are two position data that the verification part 260 has obtained at two timings at which the vibration is switched on and off, there are three position data including the position data obtained when the manipulation input is performed at first and the two position data.

In this case, for example, the verification part 260 recognizes a first direction and a second direction as the direction of manipulation input. The first direction is determined by the position data (a first position data) obtained when the manipulation input is performed at first and the position data (a second position data) obtained in first among the two position data. The second direction is determined by the position data (the second position data) obtained in first among the two position data and the position data (a third position data) obtained in second among the two position data.

The verification part 260 may recognize an average direction of the first direction and the second direction as the direction of the manipulation input.

The verification part 260 may recognize the direction of the manipulation input by another method based on the first position data, the second position data and the third position data.

The verification part 260 may recognize the direction of the manipulation input based on all of the position data output from the driver IC 151. However, the verification part 260 can recognize the direction of the manipulation input easily by using the position data obtained when the manipulation input is performed at first and the position data obtained at the timing at which the vibration is switched on and off.

The verification part 260 determines whether the verification of the first passcode is successfully completed by verifying the passcode data stored in the memory 250 with the numerical values and the directions recognized at step S11 (step S12).

At step S12, the verification part 260 determines if the numerical values of the first digit and the second digit recognized at step S11 coincide with the numerical values of the first digit and the second digit of the first passcode of the passcode data.

The verification part 260 determines whether the direction of the manipulation input coincide with the direction represented by the direction data by determining if the direction of the manipulation input as recognized as described above falls within the direction represented by the direction data.

The verification part 260 determines whether the verification of the first passcode is successfully completed as described above.

If the verification part 260 determines that the verification of the first passcode is successfully completed, the verification part 260 outputs the first signal to the lock controller 270 (step S13).

For the sake of performing the verification of the second passcode, the verification part 260 counts the number of times that the vibration is switched on and off based on the drive signal output from the drive controller 240 and monitors the direction of the manipulation input based on the position data output from the driver IC 151 (step S14).

The verification part 260 determines whether the verification of the second passcode is successfully completed by verifying the passcode data stored in the memory 250 with the numerical value and the direction recognized at step S14 (step S15).

At step S15, the verification part 260 determines whether the numerical value recognized at step S14 as described above coincides with the numerical value of the second passcode of the passcode data and determines whether the direction of the manipulation input recognized as described above falls within the direction represented by the direction data.

The verification part 260 determines whether the verification of the second passcode is successfully completed as described above.

If the verification of the second passcode is successfully completed, the verification part 260 outputs the second signal to the application processor 220 (step S16).

In a case where the verification of the first passcode is not successfully completed (S12: NO), the verification part 260 returns the flow to START. In this case, the verification part 260 stands ready for the next input. If the verification of the first passcode is not successfully completed for designated number of times in succession, the verification part 260 may set the electronic device 100 to an operational mode in which the electronic device 100 does not accept an input of the first passcode for a designated period of time.

In a case where the verification of the second passcode is not successfully completed (S15: NO), the verification part 260 finishes the processes (END). In a case where the second passcode is not input, the verification part 260 finishes the processes in a similar manner.

The processes performed by the verification part 260 is finished as described above.

According to the embodiment as described above, the first passcode is constituted by the numerical value of the first digit and the numerical value of the second digit. However, the user can set the numerical value(s) and a number of the digit(s) of the first passcode in his or her preference. Accordingly, the verification part 260 may perform the determination processes based on contents of the first passcode that is set by the user. The same applies to the second passcode.

In a case where the second passcode is not set, the verification part 260 finishes the processes at step S13.

In a case where the passcode data have the simpler data configuration, the verification part 260 performs the verification process in accordance with the simpler data configuration. For example, the angle data that represents the angle between the direction in which the first digit of the first passcode is input and the direction in which the second digit of the first passcode is input is associated with the first passcode, the verification part 260 determines whether the angle between the direction in which the first digit of the first passcode is input by the user and the direction in which the second digit of the first passcode is input by the user falls within the angular range represented by the angle data.

In the following, examples of the operating states of the electronic device 100 according to the embodiment are described with reference to FIGS. 12 to 17.

Figure 12:
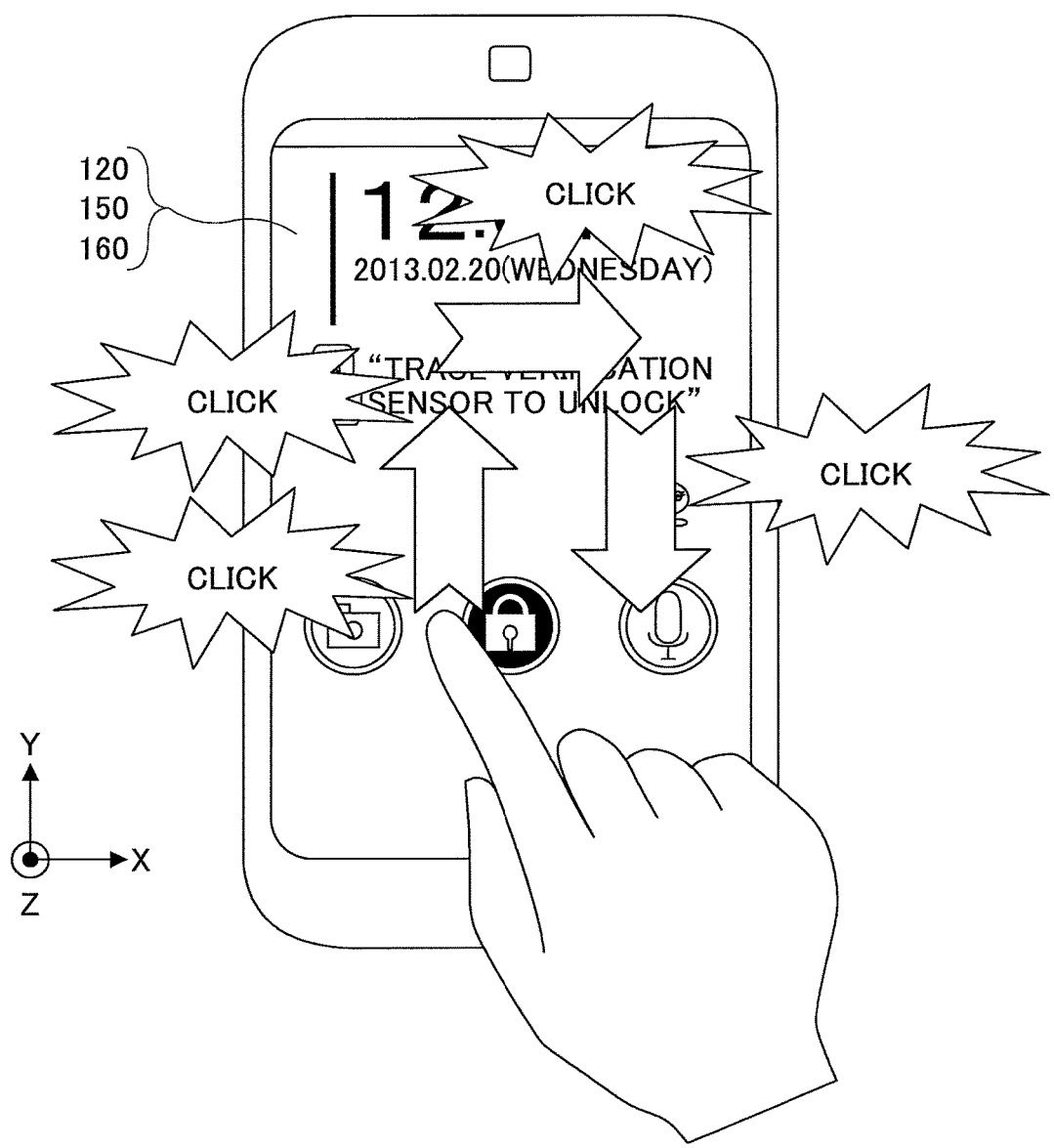
FIG. 12 is a diagram illustrating an operating state of the electronic device according to the embodiment.
Figures 13, 14:
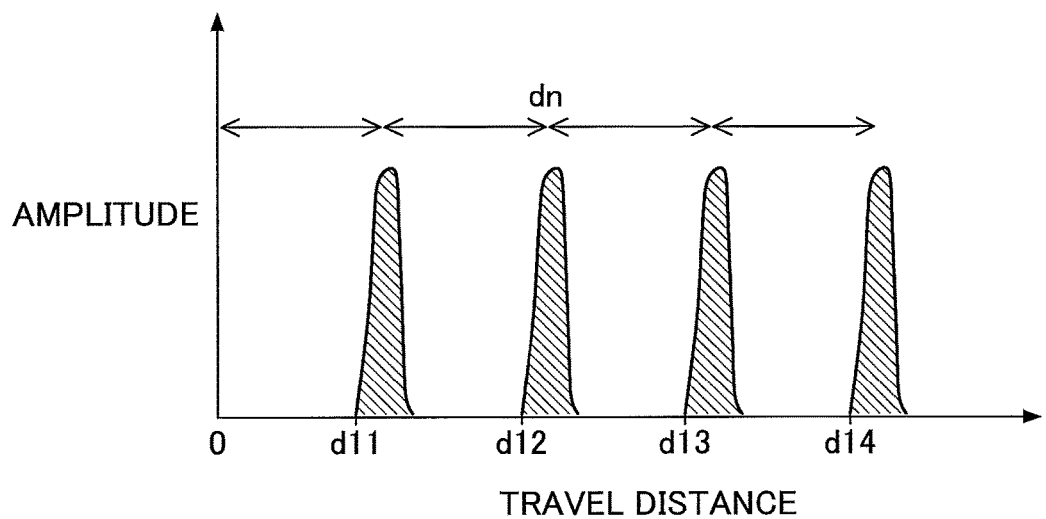
FIG. 13 is a diagram illustrating another driving waveform used for driving the vibrating element of the electronic device.
FIG. 14 is a diagram illustrating data in which data representing a second passcode and data representing types of applications executed by the second passcode are associated with each other.

FIG. 12 is a diagram illustrating the operating state of the electronic device 100 according to the embodiment. FIG. 13 is a diagram illustrating another driving waveform used for driving the vibrating element 140 of the electronic device 100. In FIG. 12, XYZ coordinate system similar to that defined in FIGS. 2 to 4 is defined.

For example, in a case where the passcode data as illustrated in FIG. 8 is set, the user may perform the drag operation and input the first passcode and the second passcode as illustrated in FIG. 12. In FIG. 12, the display panel 160 of the electronic device 100 displays a guidance message "Trace verification sensor to unlock". The verification sensor is a name of a sensor used for inputting the passcode(s). The verification sensor is constituted of the top panel 120 and the touch panel 150.

When turning on the electronic device 100, the user inputs the numerical value '2' of the first digit of the first passcode by moving the fingertip in Y-axis positive direction until the user feels the concavity and the convexity twice with the fingertip touching the top panel 120.

Then, the user changes the travel direction of the fingertip to X-axis positive direction and input the numerical value '1' of the second digit by moving the fingertip until the user feels the concavity and the convexity once with the fingertip while touching the top panel 120. The tactile sensation of the concavity and the convexity provides the user with a clicky sensation as if the user manipulates a so-called metal dome button.

Herewith, the user finishes inputting the first passcode. The verification part 260 performs the verification of the first passcode and the lock controller 270 unlocks the electronic device 100.

The user changes the travel direction of the fingertip to Y-axis negative direction and can input the numerical value '3' of the second passcode by moving the fingertip until the user feels the concavity and the convexity thrice with the fingertip while touching the top panel 120.

Herewith, the user finishes inputting the second passcode. The verification part 260 performs the verification of the second passcode and the application processor 220 executes the application identified by the second passcode.

Every time the travel distance of the position of the manipulation input reaches the unit travel distance dm, the drive controller 240 drives the vibrating element 140 in response to the driving pattern as illustrated in FIG. 7.

Herein, the drive controller 240 switches on for a moment every time the travel distance of the position of the manipulation input reaches the unit travel distance dm when the user inputs the numerical values of the first digit and the second digit of the first passcode and the numerical value of the second passcode. The unit travel distance is set to dm in all cases. However, a unit travel distance do as illustrated in FIG. 13 may be used instead of the unit travel distance dm for any one of the first digit, the second digit and the second passcode.

According to the driving waveform as illustrated in FIG. 13, the vibrating element 140 is switched on for a moment every time the travel distance of the position of the manipulation input reaches the unit travel distance dn. The unit travel distance dn is longer than the unit travel distance dm as illustrated in FIG. 7. Since the top panel 120 has longer length in Y axis direction than in X axis direction, the unit travel distance dn may be used when the manipulation input is performed in Y axis direction and the unit travel distance dm may be used when the manipulation input is performed in X axis direction, for example.

The unit travel distance may be set in different values in response to types of the numerical values. In this case, data representing the unit travel distances may be associated with the numerical values of the first digit and the second digit of the first passcode and the numerical value of the second passcode as illustrated in FIG. 8. The drive controller 240 uses any one of the data of the unit travel distances in response to the input numerical value.

Otherwise, the unit travel distance may be changed in a random manner in response to the input numerical value. In this case, it becomes possible to make the numerical value(s) less guessable, if the numerical value(s) input by the user is seen by someone else.

The application executed by the second passcode may be set as follows as illustrated in FIG. 14. FIG. 14 is a diagram illustrating data in which the data representing the second passcode and data representing types of the applications executed by the second passcode are associated with each other.

In FIG. 14, three numerical values '1', '2' and '3' are illustrated as the second passcodes and app1, app2 and app3 are illustrated as the data representing the types of the applications. Data app1, app2 and app3 correspond to applications of a telephone, email and camera, respectively, for example.

As the user inputs the first passcode, the electronic device 100 is unlocked. And then the user can launch the desired application immediately by inputting any one of the numerical values '1', '2' and '3' as the second passcode. The user can select the application while sensing the number of vibrations caused by the drive controller 240 that drives the vibrating element 140 in response to the travel distance of the position of the manipulation input performed onto the top panel 120.

If the three numerical values are set in advance as the second passcode as illustrated in FIG. 14, the user can launch the desired application immediately. Accordingly, it is possible to enhance the convenience of the electronic device 100.

In the following, examples of other operating states of the electronic device 100 according to the embodiment are described with reference to FIGS. 15 to 17.

Figure 15:
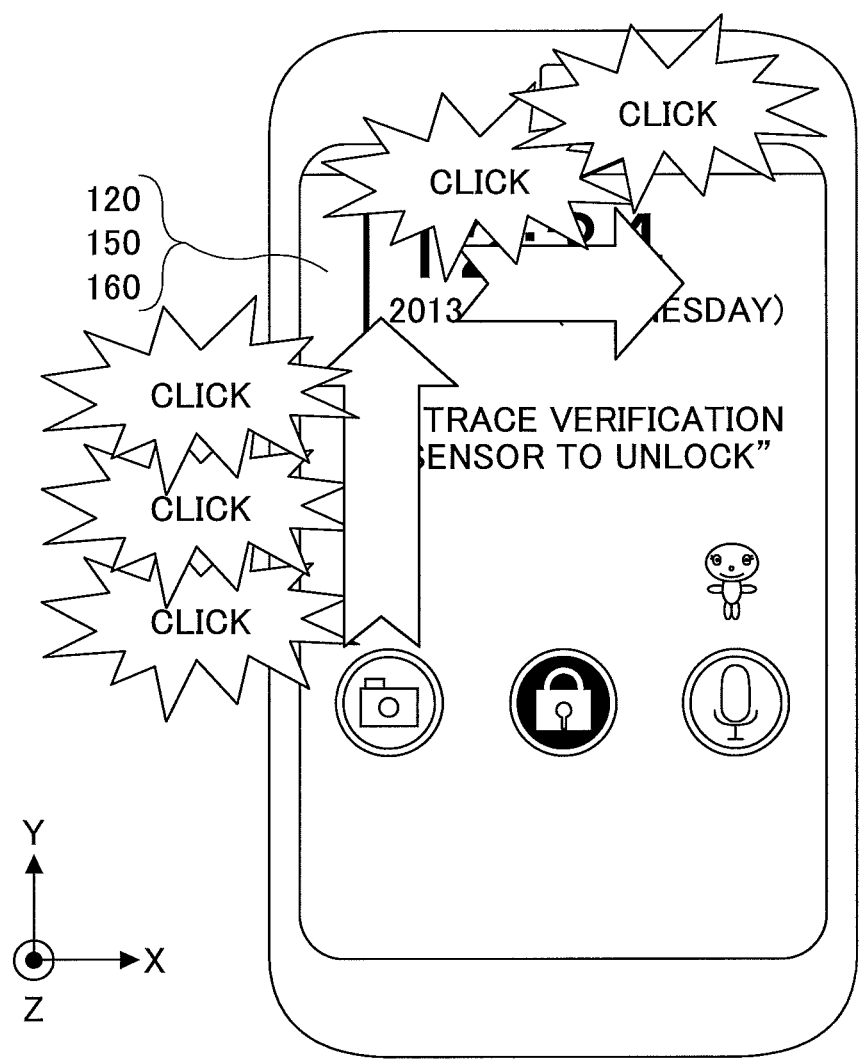
FIG. 15 is a diagram illustrating an operating states of the electronic device according to the embodiment.
Figure 16:
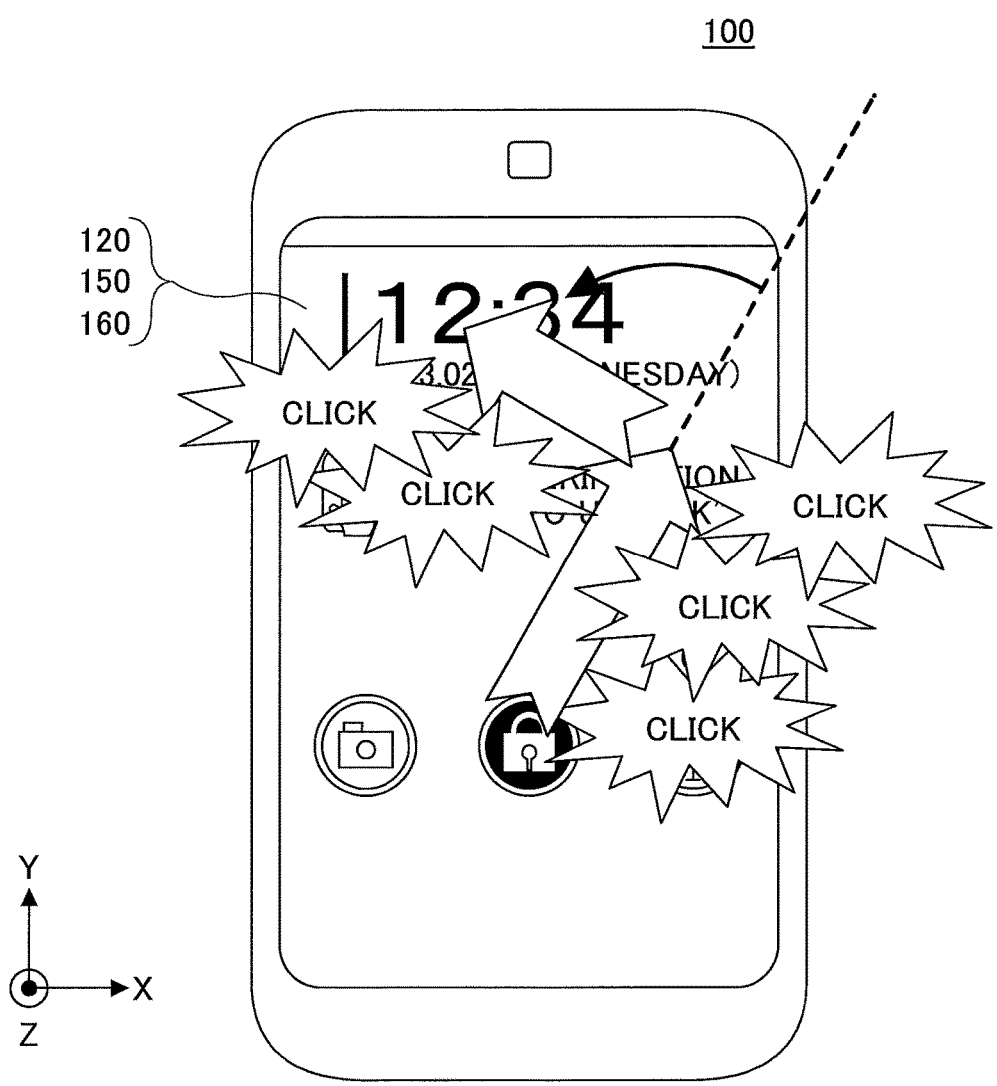
FIG. 16 is a diagram illustrating an operating states of the electronic device according to the embodiment.
Figure 17:
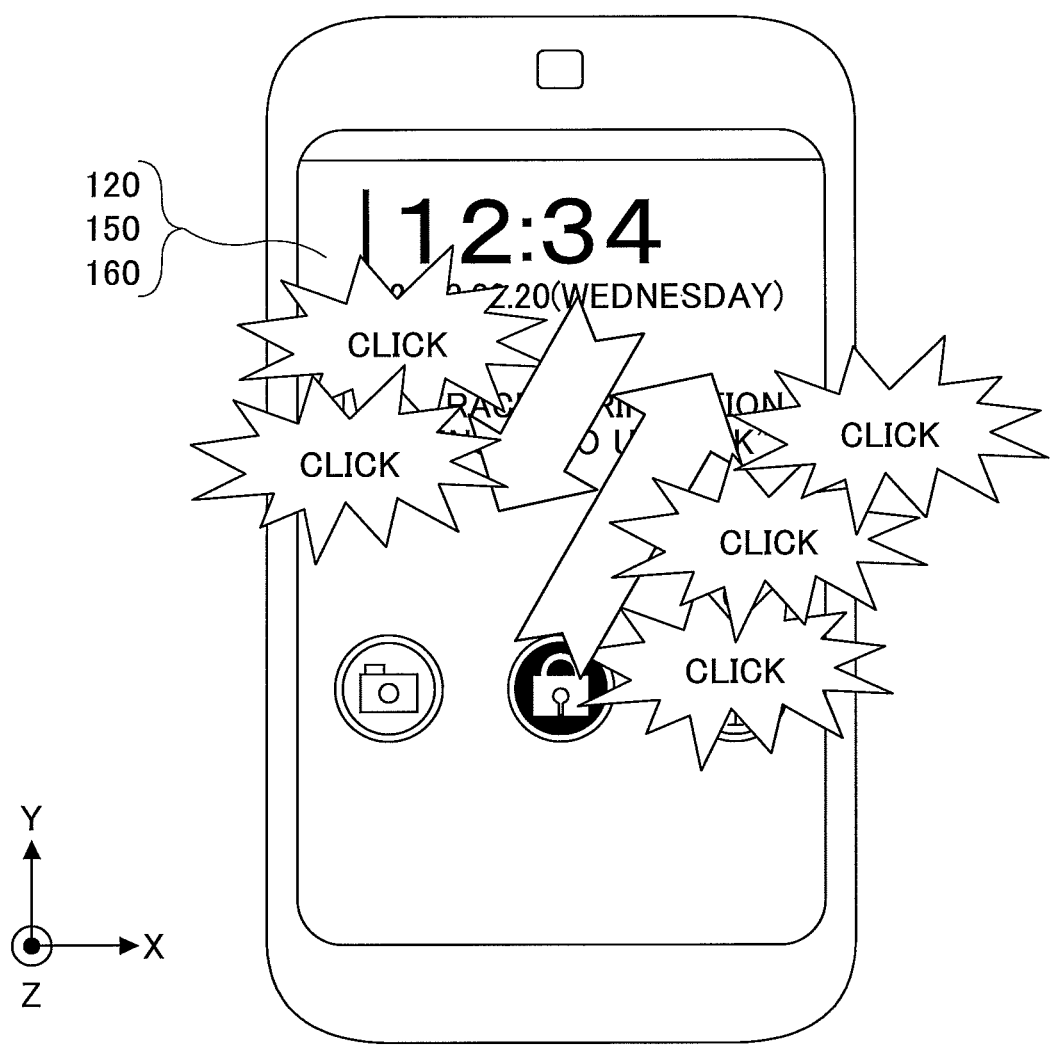
FIG. 17 is a diagram illustrating an operating states of the electronic device according to the embodiment.

FIGS. 15 to 17 are diagrams illustrating the operating states of the electronic device 100 according to the embodiment. In FIGS. 15 to 17, XYZ coordinate systems similar to that defined in FIGS. 2 to 4 are defined.

As illustrated in FIG. 15, when the user turns on the electronic device 100, the user inputs the numerical value '3' of the first digit by moving the fingertip until the user feels the concavity and the convexity twice with the fingertip while touching the top panel 120. The tactile sensation of the concavity and the convexity provides the user with a clicky sensation as if the user manipulates a so-called metal dome button.

The user changes the travel direction of the fingertip to X-axis positive direction and inputs the numerical value '2' of the second digit of the first passcode by moving the fingertip until the user feels the concavity and the convexity once with the fingertip while touching the top panel 120.

Herewith, the user finishes inputting the first passcode. The verification part 260 performs the verification of the first passcode and the lock controller 270 unlocks the electronic device 100.

If the user gets their fingertip off of the top panel 120, the user can unlock the electronic device 100. Then the user can use the electronic device 100.

In this case, if the user gets their fingertip off of the top panel 120 on completion of inputting the first passcode and the user does not input the second passcode, the application identified with the second passcode is not launched.

As illustrated in FIG. 16, the user may perform the drag operation in an oblique direction with respect to X axis and Y axis in order to input the numerical values of the first digit and the second digit of the first passcode. Herein, a case in which the numerical value of the first digit is '3' and the numerical value of the second digit is '2' is illustrated. The direction in which the first digit is input falls within the angular range as illustrated in FIG. 9 and the direction in which the second digit is input falls within the angular range 4 as illustrated in FIG. 9. In this case, the user sets the first digit as '3', the first direction data as '2', the second digit as '2', the second direction data as '4'.

In a case where the direction of inputting the first digit and the direction of inputting the second digit are different as illustrated in FIG. 16, data representing an angle between the direction of inputting the first digit and the direction of inputting the second digit may be added to the passcode data.

The travel direction of the position of the manipulation input is changed right after inputting the first digit. Therefore, it is better to determine the angular range within which the angle obtained when the travel direction is changed falls and to add an additional direction data representing the angle to the passcode data.

In this case, the passcode data (see FIG. 8) may not include the first direction data and the second direction data but may include only the angle data representing the angle between the direction of inputting the numerical value of the first digit and the direction of inputting the numerical value of the second digit. As a result, it is possible to simplify the data configuration of the passcode data.

In this case, the angle between the direction of inputting the numerical value of the first digit and the direction of inputting the numerical value of the second digit only have to fall within the angular range. The direction of inputting the first digit may be any direction.

FIG. 17 illustrates the operational example in which the direction of inputting the first digit and the direction of inputting the second digit by the drag operation is different from that illustrated in FIG. 16.

In FIG. 17, the numerical value of the first digit is '3', the direction of inputting the first digit falls within the angular range 2, the numerical value of the second digit is '2', and the direction of inputting the second digit falls within the angular range 6. The angle occurred when the travel direction of the position of the manipulation input is changed right after inputting the first digit falls within the angular range 5.

Since the kinetic friction force applied to the user's fingertip is varied by generating the natural vibration at the ultrasound-frequency-band to the top panel 120, the electronic device 100 of the embodiment can provide a fine or crispy tactile sensation (tactile sense) to the user.

Therefore the user of the electronic device 100 can input the first passcode and the second passcode easily while obtaining the fine and crisp tactile sensation.

The electronic device 100 may be a smart phone, tablet computer or the like. Therefore, the electronic device 100 has a function that locks the electronic device 100 in a case where the manipulation input is not performed for a short period of time. Accordingly, it is necessary to unlock the electronic device 100 and this is stressful.

In this regard, according to the embodiment, the user can input the first passcode by performing the drag operation. The first passcode is set by his or her own choice. The user can recognize the travel distance of the position of the manipulation input by the number of times the intensity of the natural vibration of the top panel 120 is changed. Accordingly, the user can input the first passcode easily while obtaining the fine and crisp tactile sensation. This is the same when inputting the second passcode after inputting the first passcode.

Since the user can recognize the travel distance by the tactile sensation provided to the fingertip from the top panel 120, it is possible to input the passcode(s) by performing touch typing.

According to the embodiment, it is possible to reduce stress when the user unlocks the electronic device 100 and to provide the electronic device 100 with enhanced convenience.

Inputting the first passcode by the drag operation is less guessable for someone else than inputting the first passcode into a 10-key numeric keypad. Accordingly, it is possible to enhance security of the electronic device 100.

In a case where the user inputs the second passcode in succession to the first passcode, the user can launch the application that is set in advance. Accordingly, it is possible to provide the electronic device 100 with enhanced convenience.

According to the embodiment as described above, the electronic device 100 has the function that unlocks the electronic device 100 by inputting the first passcode by performing the drag operation. However, the electronic device 100 may have a function that requires inputting the first passcode into the 10-key numeric keypad displayed on the display panel 160 in addition to the function requiring the drag operation. In this case, the electronic device 100 may provide an option to select one of the two functions for the user.

The electronic device 100 of the embodiment generates the drive signal by causing the amplitude modulator 320 to modulate only the amplitude of the sinusoidal wave at the ultrasound-frequency-band output from the sinusoidal wave generator 310. The frequency of the sinusoidal wave at the ultrasound-frequency-band generated by the sinusoidal wave generator 310 is equal to the natural vibration frequency of the top panel 120. The natural vibration frequency is determined in consideration of the weight of the vibrating element 140.

The drive signal is generated at the amplitude modulator 320 by modulating only the amplitude of the sinusoidal wave at the ultrasound-frequency-band generated by the sinusoidal wave generator 310 without modulating the frequency or the phase of the sinusoidal wave.

Accordingly, it becomes possible to generate the natural vibration of the top panel 120 at the ultrasound-frequency-band in the top panel 120 and to reduce the kinetic friction coefficient applied to the fingertip tracing the top panel 120 most surely by utilizing the layer of air provided by the squeeze film effect. It becomes possible to provide the fine or crisp tactile sensation as if the concavity or the convexity is existing on the surface of the top panel 120 by utilizing the Sticky-band Illusion effect or the Fishbone Tactile Illusion effect to the user.

In the embodiment as described above, for the sake of providing the sense as if the concavity or the convexity is existing on the top panel 120 to the user, the vibrating element 140 is switched on and off. Turning off the vibrating element 140 is equal to setting the amplitude value represented by the drive signal used for driving the vibrating element 140 to zero.

However, it is not necessary to turn off the vibrating element 140 from a being turned on state. For example, the vibrating element 140 is driven based on the drive signal having a small amplitude instead of turning off the vibrating element 140. For example, the electronic device 100 may provide the sense as if the concavity or the convexity is existing on the surface of the top panel 120 by reducing the amplitude to about one-fifth of that of the turned on state.

In this case, the vibrating element 140 is driven by the drive signal in a manner that the vibration of the vibrating element 140 is switched between a strong level and weak level. As a result, the strength of the natural vibration generated in the top panel 120 is switched between the strong level and the weak level. It becomes possible to provide the sense as if the concavity or the convexity is existing on the surface of the top panel 120 through the user's fingertip.

If the electronic device 100 turns off the vibrating element 140 when making the vibration weaker in order to switch the vibration of the vibrating element 140 from the strong level to the weak level, the vibrating element 140 is switched on and off. Switching on and off the vibrating element 140 means driving the vibrating element 140 intermittently.

In the embodiment as described above, the user inputs the first passcode in order to unlock the electronic device 100. However, the embodiment is not limited for inputting the first passcode for the sake of unlocking. For example, the electronic device 100 may require the user to input a passcode in a manner similar to that as described above while the electronic device 100 is executing a designated application or the like.

In the embodiment as described above, the first passcode is constituted of the number of times the vibration is switched on and off and the direction of the manipulation input. However, the first passcode may not include the direction of the manipulation input. In this case, the electronic device 100 does not require the direction of the manipulation input as the first passcode. The electronic device 100 only requires the number of times that the vibration is switched on and off as the first passcode when the user performs the drag operation on the top panel 120 in any direction.

Accordingly, it is possible to provide an electronic device and a verification method that makes it possible for a user to input a requied information easily by providing a fine or crisp tactile sensation to a user.

In the above description, an electronic device and a verification method according to embodiments are described. However, the present invention is not limited to the embodiments specifically disclosed. A person skilled in the art may easily achieve various modification and changes without departing from the scope of the present invention.

The other objects, features, and benefits of the present application may become further clear by referring to the accompanying drawing and embodiments described above.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of superiority or inferiority of the invention. Although the embodiment of the present invention has been described in detail, it should be understood that various changes, substitutions, and alterations could be made hereto without departing from the spirit and scope of the invention.

What is claimed is:

1. An electronic device comprising:
a top panel having a manipulation input surface;
a position detector detecting a position of a manipulation input performed on the manipulation input surface;
a vibrating element generating a vibration in the manipulation input surface;
a drive controller being configured to drive the vibrating element by using a drive signal causing the vibrating element to generate a natural vibration in an ultrasound-frequency-band in the manipulation input surface, the drive controller being configured to drive the vibrating element so as to switch the natural vibration between a strong level and a weak level in accordance with a travel distance of a position of a manipulation input performed onto the manipulation input surface;
a first memory configured to store first data representing a first passcode corresponding to a first number of times the natural vibration is switched between the strong level and the weak level; and
a first verification part configured to verify a second number of times the drive controller switches the natural vibration between the strong level and the weak level with the first passcode represented by the first data when the manipulation input is performed onto the manipulation input surface.

2. The electronic device as claimed in claim 1, further comprising:
a display part;
wherein the position detector is disposed on a display surface side of the display part.

3. The electronic device as claimed in claim 1, wherein the first data further includes first passcode direction data representing a travel direction of the manipulation input, the travel direction representing a direction of inputting the first passcode, and
wherein the first verification part verifies the second number of times the drive controller switches the natural vibration between the strong level and the weak level with the first passcode and verifies a travel direction of the manipulation input with the travel direction of the manipulation input represented by the first passcode direction data.

4. The electronic device as claimed in claim 1, further comprising:
an unlocking part configured to unlock the electronic device if the first verification part determines that the verification is successfully completed.

5. The electronic device as claimed in claim 4, further comprising:
a second memory configured to store second data representing a second passcode, the second passcode indicating an execution command for executing a designated application, the second passcode corresponding to a third number of times the natural vibration is switched between the strong level and the weak level;
a second verification part configured to verify a fourth number of times the drive controller switches the natural vibration between the strong level and the weak level with the second passcode represented by the second data when the manipulation input is performed on the manipulation input surface in a case where the electronic device is unlocked by the unlocking part; and
an application execution part configured to execute the designated application if the second verification part determines that the verification of the second passcode is successfully completed.

6. The electronic device as claimed in claim 5, wherein the second data further includes a second passcode direction data representing a travel direction of the manipulation input, the travel direction representing a direction of inputting the second passcode, and
wherein the second verification part verifies the fourth number of times the drive controller switches the natural vibration between the strong level and the weak level with the second passcode represented by the second data and verifies the travel direction of the manipulation input with the travel direction of the manipulation input represented by the second passcode direction data.

7. The electronic device as claimed in claim 1, wherein the drive signal causes the vibrating element to generate the natural vibration in the ultrasound-frequency-band in the manipulation input surface, the natural vibration having a constant frequency and a constant phase.

8. The electronic device as claimed in claim 1, wherein the drive controller drives the vibrating element so as to switch the natural vibration between the strong level and the weak level when the travel distance of the position of the manipulation input reaches a unit travel distance.

9. The electronic device as claimed in claim 1, wherein the manipulation input surface has a rectangular shape having long sides and short sides in plan view, and
wherein the drive controller causes the vibrating element to vibrate so that a standing wave of which amplitude varies along the long side occurs on the manipulation input surface.

10. The electronic device as claimed in claim 1, wherein the drive controller drives the vibrating element intermittently so as to switch the natural vibration between the strong level and the weak level.

11. A verification method for performing a verification of an electronic device including a top panel having a manipulation input surface, a position detector detecting a position of a manipulation input performed on the manipulation input surface, a vibrating element generating a vibration in the manipulation input surface, a drive controller being configured to drive the vibrating element by using a drive signal causing the vibrating element to generate a natural vibration in an ultrasound-frequency-band in the manipulation input surface, the drive controller being configured to drive the vibrating element so as to switch the natural vibration between a strong level and a weak level in accordance with a travel distance of a position of a manipulation input performed onto the manipulation input surface, and a first memory configured to store first data representing a first passcode corresponding to a first number of times the natural vibration is switched between the strong level and the weak level, comprising:
verifying, by a computer, a second number of times the drive controller switches the natural vibration between the strong level and the weak level with the first passcode represented by the first data when the manipulation input is performed onto the manipulation input surface.

* * * * *